United States Patent
Ingraham et al.

(10) Patent No.: US 7,024,430 B1
(45) Date of Patent: Apr. 4, 2006

(54) METHOD AND SYSTEM FOR IMPLEMENTING A FILTER IN A DATA SYNCHRONIZATION SYSTEM

(75) Inventors: Mary Edith Ingraham, Santa Cruz, CA (US); Chris LaRue, Santa Cruz, CA (US)

(73) Assignee: Starfish Software, Inc., Scotts Valley, CA (US)

( * ) Notice: Subject to any disclaimer, the term of this patent is extended or adjusted under 35 U.S.C. 154(b) by 625 days.

(21) Appl. No.: 10/176,995

(22) Filed: Jun. 21, 2002

Related U.S. Application Data

(63) Continuation-in-part of application No. 10/094,110, filed on Mar. 8, 2002, and a continuation-in-part of application No. 09/928,609, filed on Aug. 13, 2001, and a continuation-in-part of application No. 09/679,944, filed on Oct. 4, 2000, now Pat. No. 6,810,405, and a continuation-in-part of application No. 09/289,551, filed on Apr. 9, 1999, now Pat. No. 6,460,051, and a continuation-in-part of application No. 09/208,815, filed on Dec. 8, 1998, now Pat. No. 6,477,545.

(51) Int. Cl.
 *G06F 17/30* (2006.01)

(52) U.S. Cl. .............................. 707/201; 707/8; 707/10; 707/202

(58) Field of Classification Search ................ 707/8, 707/10, 201, 202, 3, 4; 709/220, 225; 714/12
See application file for complete search history.

(56) References Cited

U.S. PATENT DOCUMENTS

| | | | | |
|---|---|---|---|---|
| 4,769,796 A | * | 9/1988 | Levine | 368/29 |
| 4,866,611 A | * | 9/1989 | Cree et al. | 708/112 |
| 4,881,179 A | * | 11/1989 | Vincent | 358/1.14 |
| 4,977,520 A | * | 12/1990 | McGaughey et al. | 345/753 |
| 5,113,380 A | * | 5/1992 | Levine | 368/10 |
| 5,224,212 A | * | 6/1993 | Rosenthal et al. | 710/53 |
| 5,392,390 A | * | 2/1995 | Crozier | 345/762 |
| 5,442,783 A | * | 8/1995 | Oswald et al. | 707/101 |
| 5,519,606 A | * | 5/1996 | Frid-Nielsen et al. | 705/9 |
| 5,666,553 A | * | 9/1997 | Crozier | 715/540 |
| 5,684,990 A | * | 11/1997 | Boothby | 707/203 |
| 5,710,922 A | * | 1/1998 | Alley et al. | 707/201 |
| 5,727,202 A | * | 3/1998 | Kucala | 707/10 |
| 5,729,735 A | | 3/1998 | Meyerling | |
| 5,758,337 A | | 5/1998 | Hammond | |
| 5,926,816 A | | 7/1999 | Bauer et al. | |
| 5,966,714 A | | 10/1999 | Huang et al. | |
| 6,141,664 A | | 10/2000 | Boothby | |
| 6,212,529 B1 | | 4/2001 | Boothby et al. | |

* cited by examiner

*Primary Examiner*—Jean M. Corrielus
(74) *Attorney, Agent, or Firm*—Ernest J. Beffel, Jr.; Haynes Beffel & Wolfeld LLP

(57) ABSTRACT

A method and system for synchronizing data between a dataset and a data subset, in which filter criteria determine which data records in the dataset are excluded from the data subset. However, the filter is not applied to every record of the dataset during each synchronization. Instead, during a synchronization, the filter is applied to incoming changes received from the data subset and to outgoing changes that are intended to be sent to the data subset. Appropriate actions are taken on these changes to implement the filter parameters. When a filter is changed or newly activated, a method is performed which prepares the synchronization system so that, when the next synchronization is performed, the dataset and the data subset will automatically be synchronized according to the new filter, due to the standard application of the filter parameters during a standard synchronization.

39 Claims, 26 Drawing Sheets

DEVICE DB — 106

| RECORD ID | RECORD DATA | MOD TIME |
|---|---|---|
| D0 | FIRST RECORD | * |
| D1 | SECOND RECORD | * |
| D2 | THIRD RECORD | * |
| ... | ... | ... |
| DN | LAST RECORD | * |

SYNC DB — 126

| SERVER RECORD ID | RECORD DATA | MOD TIME |
|---|---|---|
| S0 | FIRST RECORD | * |
| S1 | SECOND RECORD | * |
| S2 | THIRD RECORD | * |
| ... | ... | ... |
| SN | LAST RECORD | * |

MAPPING TABLE — 128

| SERVER RECORD ID | USER ID | DEVICE ID | CLIENT RECORD ID | SYNC TIME |
|---|---|---|---|---|
| * | * | * | * | * |
| * | * | * | * | * |
| * | * | * | * | * |
| ... | ... | ... | ... | ... |
| * | * | * | * | * |

| 700 TIME | 702 DEVICE | 704 << SYNC COMM >> | 706 SYNC ENGINE | 708 << DB COMM >> | 710 DB MANAGER |
|---|---|---|---|---|---|
| 800 | | | INITIAL TIME FILTER 123A IS ACTIVE: CITY = DALLAS OR SAN DIEGO DEVICE DB, SERVER DB, MAPPING TABLE PER FIGS. 8A-8C | | |
| 801 | BILL.CITY=DAYTON FRAN.CITY=DALLAS JOAN DELETED AL, TONY, JAMES ADDED | | | | |
| 802 | | | LISA, FRED DELETED JANE.CITY=CHICAGO ED.CITY=SAN DIEGO MIKE.CITY=SAN DIEGO SALLY.CITY=DAYTON TED, ANNE ADDED | DELETE LISA, FRED >> UPDATE JANE, ED, MIKE, SALLY >> ADD TED, ANNE >> | RECORDS DELETED, UPDATED, ADDED |
| 803 | SYNC 1 INITIATED | | | | |
| 804 | | SYNC REQUEST >> | | | |
| 805 | | UPDATE BILL, FRAN >> DELETE JOAN >> ADD AL, TONY, JAMES >> | | | |

FIG. 7A

| 700 TIME | 702 DEVICE | 704 << SYNC COMM >> | 706 SYNC ENGINE | 708 << DB COMM >> | 710 DB MANAGER |
|---|---|---|---|---|---|
| 806 | | | CONFLICT, DUPLICATE RESOLUTION | | |
| 807 | | | APPLY FILTER 123A TO CHANGES FROM DEVICE | | |
| 808 | | | | UPDATE BILL, FRAN >><br>DELETE JOAN >><br>ADD AL, TONY, JAMES >> | RECORDS UPDATED, DELETED, ADDED |
| 809 | | | | UPDATE FRAN'S SYNC TIME >><br>DEL JOAN'S MAP >><br>ADD MAP FOR AL, TONY, JAMES >><br>NULL SYNC TIME FOR BILL, TONY, JAMES >> | MAPPINGS DELETED, ADDED, SYNC TIMES UPDATED, NULLED |
| 810 | | | COLLECT FRESH CHANGES FROM OTHER DEVICES | | |
| 811 | | | CONFLICT, DUPLICATE RESOLUTION | | |

FIG. 7B

| 700 TIME | 702 DEVICE | 704 << SYNC COMM >> | 706 SYNC ENGINE | 708 << DB COMM >> | 710 DB MANAGER |
|---|---|---|---|---|---|
| 812 | | | APPLY RESPECTIVE FILTERS, IF ANY, TO CHANGES FROM OTHER DEVICES | | |
| 813 | | | | IMPLEMENT SURVIVING CHANGES >> | STORE SURVIVING CHANGES |
| 814 | | | | UPDATE, NULL SYNC TIMES >> ADD MAPPINGS >> | MAPPINGS ADDED, SYNC TIMES UPDATED, NULLED |
| 815 | | | | REQUEST FRESH CHANGES >> | |
| 816 | | | | | DETERMINE FRESH CHANGES |
| 817 | | | | << LISA, FRED DELETED << JANE, ED, MIKE, SALLY, BILL, TONY, JAMES UPDATED << TED, ANNE ADDED | |

FIG. 7C

| 700 TIME | 702 DEVICE | 704 << SYNC COMM >> | 706 SYNC ENGINE | 708 << DB COMM >> | 710 DB MANAGER |
|---|---|---|---|---|---|
| 818 | | | APPLY FILTER 123A TO CHANGES TO DEVICE | MAP ANNE >><br>DEL FRED'S MAP >><br>UPDATE MAP FOR JANE >> | ANNE MAPPED, FRED DELETED, JANE UPDATED |
| 819 | RECORDS DELETED, UPDATED, ADDED | << DELETE BILL, LISA, SALLY, TONY, JAMES<br><< UPDATE MIKE<br><< ADD ED, TED | | | |
| 820 | | MAP ED, TED >><br>ACK DELETES, UPDATE >> | RECEIVE MAPS, ACKS | MAP ED, TED >><br>DELETE MAP FOR LISA >><br>UPDATE OTHER MAPPINGS >> | ED, TED MAPPED, OTHERS DELETED, UPDATED |
| 821 | | | APPLY RESPECTIVE FILTERS, IF ANY, TO CHANGES TO OTHER DEVICES | | |
| 822 | | | SEND CHANGES TO OTHER DEVICES | | |

FIG. 7D

| 700 TIME | 702 DEVICE | 704 << SYNC COMM >> | 706 SYNC ENGINE | 708 << DB COMM >> | 710 DB MANAGER |
|---|---|---|---|---|---|
| 823 | | | RECEIVE MAPS, ACKS FROM OTHERS | ADD, DELETE, UPDATE MAPPINGS | MAPPINGS ADDED, DELETED, UPDATED |
| 824 | | | FILTER 123B ACTIVE CITY = DALLAS OR DAYTON | | |
| 825 | | | PROCESS FILTER CHANGE | DELETE MAPPINGS FOR TIM, BILL, JANE, SALLY, ANNE, TONY, JAMES >> | MAPPINGS DELETED |
| 826 | | | | NULL SYNC TIME FOR DAN, MARK, FRAN, ED, MIKE, TED, AL >> | SYNC TIMES NULLED |
| 827 | FRAN.CITY=SAN DIEGO | | | | |
| 828 | | | SALLY DELETED BILL.CITY=CHICAGO ANNE.CITY=SAN DIEGO AL.CITY=DALLAS JOHN ADDED | DELETE SALLY >> UPDATE BILL, ANNE, AL >> ADD JOHN >> | RECORDS DELETED, UPDATED, ADDED |

FIG. 7E

| 700 TIME | 702 DEVICE | 704 << SYNC COMM >> | 706 SYNC ENGINE | 708 << DB COMM >> | 710 DB MANAGER |
|---|---|---|---|---|---|
| 837 | | | CONFLICT, DUPLICATE RESOLUTION | | |
| 838 | | | APPLY RESPECTIVE FILTERS, IF ANY, TO CHANGES FROM OTHER DEVICES | | |
| 839 | | | IMPLEMENT SURVIVING CHANGES >> | | STORE SURVIVING CHANGES |
| 840 | | | UPDATE, NULL SYNC TIMES >> ADD MAPPINGS >> | | MAPPINGS ADDED, SYNC TIMES UPDATED, NULLED |
| 841 | | | REQUEST FRESH CHANGES >> | | |
| 842 | | | | | DETERMINE FRESH CHANGES |

FIG. 7G

| 700 TIME | 702 DEVICE | 704 <<SYNC COMM>> | 706 SYNC ENGINE | 708 <<DB COMM>> | 710 DB MANAGER |
|---|---|---|---|---|---|
| 843 | | | | <<DAN, MARK, FRAN, ED, MIKE, TED, AL UPDATED <<TIM, BILL, JANE, ANNE, TONY, JAMES, JOHN ADDED | |
| 844 | | | APPLY FILTER 123B TO CHANGES TO DEVICE | MAP BILL, JANE, ANNE, JOHN >> | BILL, JANE, ANNE, JOHN MAPPED |
| 845 | RECORDS UPDATED, DELETED, ADDED | <<UPDATE DAN, TED, AL <<DELETE MARK, FRAN, ED, MIKE <<ADD TIM, TONY, JAMES | | | |
| 846 | | MAP TIM, TONY, JAMES >> ACK DELETES, UPDATES >> | RECEIVE MAPS, ACKS | MAP TIM, TONY, JAMES >> UPDATE OTHER MAPPINGS >> | TIM, TONY, JAMES MAPPED, OTHERS UPDATED |
| 847 | | | APPLY RESPECTIVE FILTERS, IF ANY, TO CHANGES TO OTHER DEVICES | | |

FIG. 7H

TIME 800 (INITIAL CONFIGURATION)  FILTER 123A: CITY = DALLAS OR SAN DIEGO

DEVICE DB 106

| 402 | 404A | 404B | 406 |
|---|---|---|---|
| ID | NAME | CITY | MOD TIME |
| D0 | DAN | DALLAS | T<800 |
| D1 | MARK | SAN DIEGO | T<800 |
| D2 | BILL | DALLAS | T<800 |
| D3 | FRAN | SAN DIEGO | T<800 |
| D4 | JOAN | DALLAS | T<800 |
| D5 | LISA | SAN DIEGO | T<800 |
| D6 | MIKE | DALLAS | T<800 |
| D7 | SALLY | SAN DIEGO | T<800 |
|  |  |  |  |
|  |  |  |  |
|  |  |  |  |
|  |  |  |  |

FIG. 8A

SYNC DB 126

| 432 | 434A | 434B | 436 |
|---|---|---|---|
| ID | NAME | CITY | MOD TIME |
| S0 | TIM | DAYTON | T<800 |
| S1 | DAN | DALLAS | T<800 |
| S2 | MARK | SAN DIEGO | T<800 |
| S3 | BILL | DALLAS | T<800 |
| S4 | FRAN | SAN DIEGO | T<800 |
| S5 | JOAN | DALLAS | T<800 |
| S6 | LISA | SAN DIEGO | T<800 |
| S7 | FRED | DAYTON | T<800 |
| S8 | JANE | DAYTON | T<800 |
| S9 | ED | DAYTON | T<800 |
| S10 | MIKE | DALLAS | T<800 |
| S11 | SALLY | SAN DIEGO | T<800 |

FIG. 8B

MAPPING TABLE 128

| 462 | 464 | 466 | 468 |
|---|---|---|---|
| S ID | DEVICE ID | C ID | SYNC TIME |
| S0 | DEVICE D |  | T<800 |
| S1 | DEVICE D | D0 | T<800 |
| S2 | DEVICE D | D1 | T<800 |
| S3 | DEVICE D | D2 | T<800 |
| S4 | DEVICE D | D3 | T<800 |
| S5 | DEVICE D | D4 | T<800 |
| S6 | DEVICE D | D5 | T<800 |
| S7 | DEVICE D |  | T<800 |
| S8 | DEVICE D |  | T<800 |
| S9 | DEVICE D |  | T<800 |
| S10 | DEVICE D | D6 | T<800 |
| S11 | DEVICE D | D7 | T<800 |

FIG. 8C

TIME 803 (AFTER DB CHANGES/BEFORE SYNC 1)   FILTER 123A: CITY = DALLAS OR SAN DIEGO

DEVICE DB 106

| 402 | 404A | 404B | 406 |
|---|---|---|---|
| ID | NAME | CITY | MOD TIME |
| D0 | DAN | DALLAS | T<800 |
| D1 | MARK | SAN DIEGO | T<800 |
| D2 | BILL | DAYTON | T=801 |
| D3 | FRAN | DALLAS | T=801 |
| [D4] | JOAN | DALLAS | T=801 |
| D5 | LISA | SAN DIEGO | T<800 |
| D6 | MIKE | DALLAS | T<800 |
| D7 | SALLY | SAN DIEGO | T=801 |
| D8 | AL | SAN DIEGO | T=801 |
| D9 | TONY | DAYTON | T=801 |
| D10 | JAMES | DAYTON | T=801 |

FIG. 9A

SYNC DB 126

| 432 | 434A | 434B | 436 |
|---|---|---|---|
| ID | NAME | CITY | MOD TIME |
| S0 | TIM | DAYTON | T<800 |
| S1 | DAN | DALLAS | T<800 |
| S2 | MARK | SAN DIEGO | T<800 |
| S3 | BILL | DALLAS | T<800 |
| S4 | FRAN | SAN DIEGO | T<800 |
| S5 | JOAN | DALLAS | T<800 |
| [S6] | LISA | SAN DIEGO | T=802 |
| [S7] | FRED | DAYTON | T=802 |
| S8 | JANE | CHICAGO | T=802 |
| S9 | ED | SAN DIEGO | T=802 |
| S10 | MIKE | SAN DIEGO | T=802 |
| S11 | SALLY | DAYTON | T=802 |
| S12 | TED | DALLAS | T=802 |
| S13 | ANNE | DAYTON | T=802 |

FIG. 9B

MAPPING TABLE 128

| 462 | 464 | 466 | 468 |
|---|---|---|---|
| S ID | DEVICE ID | C ID | SYNC TIME |
| S0 | DEVICE D | | T<800 |
| S1 | DEVICE D | D0 | T<800 |
| S2 | DEVICE D | D1 | T<800 |
| S3 | DEVICE D | D2 | T<800 |
| S4 | DEVICE D | D3 | T<800 |
| S5 | DEVICE D | D4 | T<800 |
| S6 | DEVICE D | D5 | T<800 |
| S7 | DEVICE D | | T<800 |
| S8 | DEVICE D | | T<800 |
| S9 | DEVICE D | | T<800 |
| S10 | DEVICE D | D6 | T<800 |
| S11 | DEVICE D | D7 | T<800 |

FIG. 9C

TIME 815 (AFTER INCOMING PHASE OF SYNC 1)   FILTER 123A: CITY = DALLAS OR SAN DIEGO

| 402 | 404A | 404B | 406 |
|---|---|---|---|
| ID | NAME | CITY | MOD TIME |
| D0 | DAN | DALLAS | T<800 |
| D1 | MARK | SAN DIEGO | T<800 |
| D2 | BILL | DAYTON | T=801 |
| D3 | FRAN | DALLAS | T=801 |
| [D4] | JOAN | DALLAS | T<800 |
| D5 | LISA | SAN DIEGO | T<800 |
| D6 | MIKE | DALLAS | T<800 |
| D7 | SALLY | SAN DIEGO | T<800 |
| D8 | AL | SAN DIEGO | T=801 |
| D9 | TONY | DAYTON | T=801 |
| D10 | JAMES | DAYTON | T=801 |

DEVICE DB 106

FIG. 10A

| 432 | 434A | 434B | 436 |
|---|---|---|---|
| ID | NAME | CITY | MOD TIME |
| S0 | TIM | DAYTON | T<800 |
| S1 | DAN | DALLAS | T<800 |
| S2 | MARK | SAN DIEGO | T<800 |
| S3 | BILL | DAYTON | T=808 |
| S4 | FRAN | DALLAS | T=808 |
| [S5] | JOAN | DALLAS | T=808 |
| [S6] | LISA | SAN DIEGO | T=802 |
| [S7] | FRED | DAYTON | T=802 |
| S8 | JANE | CHICAGO | T=802 |
| S9 | ED | SAN DIEGO | T=802 |
| S10 | MIKE | SAN DIEGO | T=802 |
| S11 | SALLY | DAYTON | T=802 |
| S12 | TED | DALLAS | T=802 |
| S13 | ANNE | DAYTON | T=802 |
| S14 | AL | SAN DIEGO | T=808 |
| S15 | TONY | DAYTON | T=808 |
| S16 | JAMES | DAYTON | T=808 |

SYNC DB 126

FIG. 10B

| 462 | 464 | 466 | 468 |
|---|---|---|---|
| S ID | DEVICE ID | C ID | SYNC TIME |
| S0 | DEVICE D | | T<800 |
| S1 | DEVICE D | D0 | T<800 |
| S2 | DEVICE D | D1 | T<800 |
| S3 | DEVICE D | D2 | T=0 |
| S4 | DEVICE D | D3 | T=809 |
| S6 | DEVICE D | D5 | T<800 |
| S7 | DEVICE D | | T<800 |
| S8 | DEVICE D | | T<800 |
| S9 | DEVICE D | | T<800 |
| S10 | DEVICE D | D6 | T<800 |
| S11 | DEVICE D | D7 | T<800 |
| S14 | DEVICE D | D8 | T=809 |
| S15 | DEVICE D | D9 | T=0 |
| S16 | DEVICE D | D10 | T=0 |

MAPPING TABLE 128

FIG. 10C

TIME 824 (AFTER SYNC 1)

FILTER 123A: CITY = DALLAS OR SAN DIEGO

| 402 | 404A | 404B | 406 |
|---|---|---|---|
| | DEVICE DB 106 | | |
| ID | NAME | CITY | MOD TIME |
| D0 | DAN | DALLAS | T<800 |
| D1 | MARK | SAN DIEGO | T<800 |
| [D2] | BILL | DAYTON | T=819 |
| D3 | FRAN | DALLAS | T=801 |
| D4 | JOAN | DALLAS | T=801 |
| [D5] | LISA | SAN DIEGO | T=819 |
| D6 | MIKE | SAN DIEGO | T=819 |
| [D7] | SALLY | SAN DIEGO | T=819 |
| D8 | AL | SAN DIEGO | T=801 |
| [D9] | TONY | DAYTON | T=819 |
| [D10] | JAMES | DAYTON | T=819 |
| D11 | ED | SAN DIEGO | T=819 |
| D12 | TED | DALLAS | T=819 |

FIG. 11A

| 432 | 434A | 434B | 436 |
|---|---|---|---|
| | SYNC DB 126 | | |
| ID | NAME | CITY | MOD TIME |
| S0 | TIM | DAYTON | T<800 |
| S1 | DAN | DALLAS | T<800 |
| S2 | MARK | SAN DIEGO | T<800 |
| S3 | BILL | DAYTON | T=808 |
| S4 | FRAN | DALLAS | T=808 |
| [S5] | JOAN | DALLAS | T=808 |
| [S6] | LISA | SAN DIEGO | T=802 |
| [S7] | FRED | DAYTON | T=802 |
| S8 | JANE | CHICAGO | T=802 |
| S9 | ED | SAN DIEGO | T=802 |
| S10 | MIKE | SAN DIEGO | T=802 |
| S11 | SALLY | DAYTON | T=802 |
| S12 | TED | DALLAS | T=802 |
| S13 | ANNE | DAYTON | T=802 |
| S14 | AL | SAN DIEGO | T=808 |
| S15 | TONY | DAYTON | T=808 |
| S16 | JAMES | DAYTON | T=808 |

FIG. 11B

| 462 | 464 | 466 | 468 |
|---|---|---|---|
| | MAPPING TABLE 128 | | |
| S ID | DEVICE ID | C ID | SYNC TIME |
| S0 | DEVICE D | | T<800 |
| S1 | DEVICE D | D0 | T<800 |
| S2 | DEVICE D | D1 | T<800 |
| S3 | DEVICE D | | T=820 |
| S4 | DEVICE D | D3 | T=809 |
| | | | |
| | | | |
| | | | |
| S8 | DEVICE D | | T=818 |
| S9 | DEVICE D | D11 | T=820 |
| S10 | DEVICE D | D6 | T=820 |
| S11 | DEVICE D | | T=820 |
| S12 | DEVICE D | D12 | T=820 |
| S13 | DEVICE D | | T=818 |
| S14 | DEVICE D | D8 | T=809 |
| S15 | DEVICE D | | T=820 |
| S16 | DEVICE D | | T=820 |

FIG. 11C

TIME 827 (AFTER FILTER 2 ACTIVATED)                    FILTER 123B: CITY = DALLAS OR DAYTON

DEVICE DB 106

| 402 | 404A | 404B | 406 |
|---|---|---|---|
| ID | NAME | CITY | MOD TIME |
| D0 | DAN | DALLAS | T<800 |
| D1 | MARK | SAN DIEGO | T<800 |
| [D2] | BILL | DAYTON | T=819 |
| D3 | FRAN | DALLAS | T=801 |
| [D4] | JOAN | DALLAS | T=801 |
| [D5] | LISA | SAN DIEGO | T=819 |
| D6 | MIKE | SAN DIEGO | T=819 |
| [D7] | SALLY | SAN DIEGO | T=819 |
| D8 | AL | SAN DIEGO | T=801 |
| [D9] | TONY | DAYTON | T=819 |
| [D10] | JAMES | DAYTON | T=819 |
| D11 | ED | SAN DIEGO | T=819 |
| D12 | TED | DALLAS | T=819 |

FIG. 12A

SYNC DB 126

| 432 | 434A | 434B | 436 |
|---|---|---|---|
| ID | NAME | CITY | MOD TIME |
| S0 | TIM | DAYTON | T<800 |
| S1 | DAN | DALLAS | T<800 |
| S2 | MARK | SAN DIEGO | T<800 |
| S3 | BILL | DAYTON | T=808 |
| S4 | FRAN | DALLAS | T=808 |
| [S5] | JOAN | DALLAS | T=808 |
| [S6] | LISA | SAN DIEGO | T=802 |
| [S7] | FRED | DAYTON | T=802 |
| S8 | JANE | CHICAGO | T=802 |
| S9 | ED | SAN DIEGO | T=802 |
| S10 | MIKE | SAN DIEGO | T=802 |
| S11 | SALLY | DAYTON | T=802 |
| S12 | TED | DALLAS | T=802 |
| S13 | ANNE | DAYTON | T=808 |
| S14 | AL | SAN DIEGO | T=808 |
| S15 | TONY | DAYTON | T=808 |
| S16 | JAMES | DAYTON | T=808 |

FIG. 12B

MAPPING TABLE 128

| 462 | 464 | 466 | 468 |
|---|---|---|---|
| S ID | DEVICE ID | C ID | SYNC TIME |
| S1 | DEVICE D | D0 | T=0 |
| S2 | DEVICE D | D1 | T=0 |
| S4 | DEVICE D | D3 | T=0 |
| S9 | DEVICE D | D11 | T=0 |
| S10 | DEVICE D | D6 | T=0 |
| S12 | DEVICE D | D12 | T=0 |
| S14 | DEVICE D | D8 | T=0 |

FIG. 12C

TIME 829 (AFTER DB CHANGES/BEFORE SYNC 2)   FILTER 123B: CITY = DALLAS OR DAYTON

DEVICE DB 106

| 402 | 404A | 404B | 406 |
|---|---|---|---|
| ID | NAME | CITY | MOD TIME |
| D0 | DAN | DALLAS | T<800 |
| D1 | MARK | SAN DIEGO | T<800 |
| [D2] | BILL | DAYTON | T=819 |
| D3 | FRAN | SAN DIEGO | T=827 |
| [D4] | JOAN | DALLAS | T=801 |
| [D5] | LISA | SAN DIEGO | T=819 |
| D6 | MIKE | SAN DIEGO | T=819 |
| [D7] | SALLY | SAN DIEGO | T=819 |
| D8 | AL | SAN DIEGO | T=801 |
| [D9] | TONY | DAYTON | T=819 |
| [D10] | JAMES | DAYTON | T=819 |
| D11 | ED | SAN DIEGO | T=819 |
| D12 | TED | DALLAS | T=819 |

FIG. 13A

SYNC DB 126

| 432 | 434A | 434B | 436 |
|---|---|---|---|
| ID | NAME | CITY | MOD TIME |
| S0 | TIM | DAYTON | T<800 |
| S1 | DAN | DALLAS | T<800 |
| S2 | MARK | SAN DIEGO | T<800 |
| S3 | BILL | CHICAGO | T=828 |
| S4 | FRAN | DALLAS | T=808 |
| [S5] | JOAN | DALLAS | T=802 |
| [S6] | LISA | SAN DIEGO | T=802 |
| [S7] | FRED | DAYTON | T=802 |
| S8 | JANE | CHICAGO | T=802 |
| S9 | ED | SAN DIEGO | T=802 |
| S10 | MIKE | SAN DIEGO | T=802 |
| [S11] | SALLY | DAYTON | T=828 |
| S12 | TED | DALLAS | T=802 |
| S13 | ANNE | SAN DIEGO | T=828 |
| S14 | AL | DALLAS | T=828 |
| S15 | TONY | DAYTON | T=808 |
| S16 | JAMES | DAYTON | T=808 |
| S17 | JOHN | SAN DIEGO | T=828 |

FIG. 13B

MAPPING TABLE 128

| 462 | 464 | 466 | 468 |
|---|---|---|---|
| S ID | DEVICE ID | C ID | SYNC TIME |
| S1 | DEVICE D | D0 | T=0 |
| S2 | DEVICE D | D1 | T=0 |
| S4 | DEVICE D | D3 | T=0 |
| S9 | DEVICE D | D11 | T=0 |
| S10 | DEVICE D | D6 | T=0 |
| S12 | DEVICE D | D12 | T=0 |
| S14 | DEVICE D | D8 | T=0 |

FIG. 13C

TIME 841 (AFTER INCOMING PHASE OF SYNC 2)                FILTER 123B: CITY = DALLAS OR DAYTON

DEVICE DB 106

| 402 | 404A | 404B | 406 |
|---|---|---|---|
| ID | NAME | CITY | MOD TIME |
| D0 | DAN | DALLAS | T<800 |
| D1 | MARK | SAN DIEGO | T<800 |
| [D2] | BILL | DAYTON | T=819 |
| D3 | FRAN | SAN DIEGO | T=827 |
| [D4] | JOAN | DALLAS | T=801 |
| [D5] | LISA | SAN DIEGO | T=819 |
| D6 | MIKE | SAN DIEGO | T=819 |
| [D7] | SALLY | SAN DIEGO | T=819 |
| D8 | AL | SAN DIEGO | T=801 |
| [D9] | TONY | DAYTON | T=819 |
| [D10] | JAMES | DAYTON | T=819 |
| D11 | ED | SAN DIEGO | T=819 |
| D12 | TED | DALLAS | T=819 |

FIG. 14A

SYNC DB 126

| 432 | 434A | 434B | 436 |
|---|---|---|---|
| ID | NAME | CITY | MOD TIME |
| S0 | TIM | DAYTON | T<800 |
| S1 | DAN | DALLAS | T<800 |
| S2 | MARK | SAN DIEGO | T<800 |
| S3 | BILL | CHICAGO | T=828 |
| S4 | FRAN | SAN DIEGO | T=834 |
| [S5] | JOAN | DALLAS | T=808 |
| [S6] | LISA | SAN DIEGO | T=802 |
| [S7] | FRED | DAYTON | T=802 |
| S8 | JANE | CHICAGO | T=802 |
| S9 | ED | SAN DIEGO | T=802 |
| S10 | MIKE | SAN DIEGO | T=802 |
| [S11] | SALLY | DAYTON | T=828 |
| S12 | TED | DALLAS | T=802 |
| S13 | ANNE | SAN DIEGO | T=828 |
| S14 | AL | DALLAS | T=828 |
| S15 | TONY | DAYTON | T=808 |
| S16 | JAMES | DAYTON | T=808 |
| S17 | JOHN | SAN DIEGO | T=828 |

FIG. 14B

MAPPING TABLE 128

| 462 | 464 | 466 | 468 |
|---|---|---|---|
| S ID | DEVICE ID | C ID | SYNC TIME |
| S1 | DEVICE D | D0 | T=0 |
| S2 | DEVICE D | D1 | T=0 |
| S4 | DEVICE D | D3 | T=0 |
| S9 | DEVICE D | D11 | T=0 |
| S10 | DEVICE D | D6 | T=0 |
| S12 | DEVICE D | D12 | T=0 |
| S14 | DEVICE D | D8 | T=0 |

FIG. 14C

TIME 850 (AFTER SYNC 2)

| 402 | 404A | 404B | 406 |
|---|---|---|---|
| | | | DEVICE DB 106 |
| ID | NAME | CITY | MOD TIME |
| D0 | DAN | DALLAS | T=845 |
| [D1] | MARK | SAN DIEGO | T=845 |
| [D2] | BILL | DAYTON | T=819 |
| D3 | FRAN | SAN DIEGO | T=845 |
| [D4] | JOAN | DALLAS | T=801 |
| [D5] | LISA | SAN DIEGO | T=819 |
| [D6] | MIKE | SAN DIEGO | T=845 |
| [D7] | SALLY | SAN DIEGO | T=819 |
| D8 | AL | DALLAS | T=845 |
| [D9] | TONY | DAYTON | T=819 |
| [D10] | JAMES | DAYTON | T=819 |
| [D11] | ED | SAN DIEGO | T=845 |
| D12 | TED | DALLAS | T=845 |
| D13 | TIM | DAYTON | T=845 |
| D14 | TONY | DAYTON | T=845 |
| D15 | JAMES | DAYTON | T=845 |
| | | | |
| | | | |

FIG. 15A

FILTER 123B: CITY = DALLAS OR DAYTON

| 432 | 434A | 434B | 436 |
|---|---|---|---|
| | | SYNC DB 126 | |
| ID | NAME | CITY | MOD TIME |
| S0 | TIM | DAYTON | T<800 |
| S1 | DAN | DALLAS | T<800 |
| S2 | MARK | SAN DIEGO | T<800 |
| S3 | BILL | CHICAGO | T=828 |
| S4 | FRAN | SAN DIEGO | T=834 |
| [S5] | JOAN | DALLAS | T=808 |
| [S6] | LISA | SAN DIEGO | T=802 |
| [S7] | FRED | DAYTON | T=802 |
| S8 | JANE | CHICAGO | T=802 |
| S9 | ED | SAN DIEGO | T=802 |
| S10 | MIKE | SAN DIEGO | T=802 |
| [S11] | SALLY | DAYTON | T=828 |
| S12 | TED | DALLAS | T=802 |
| S13 | ANNE | SAN DIEGO | T=828 |
| S14 | AL | DALLAS | T=828 |
| S15 | TONY | DAYTON | T=808 |
| S16 | JAMES | DAYTON | T=808 |
| S17 | JOHN | SAN DIEGO | T=828 |

FIG. 15B

MAPPING TABLE 128

| 462 | 464 | 466 | 468 |
|---|---|---|---|
| S ID | DEVICE ID | C ID | SYNC TIME |
| S0 | DEVICE D | D13 | T=846 |
| S1 | DEVICE D | D0 | T=846 |
| S2 | DEVICE D | | T=846 |
| S3 | DEVICE D | | T=844 |
| S4 | DEVICE D | | T=846 |
| | | | |
| | | | |
| | | | |
| S8 | DEVICE D | | T=846 |
| S9 | DEVICE D | | T=846 |
| S10 | DEVICE D | | T=846 |
| | | | |
| S12 | DEVICE D | D12 | T=846 |
| S13 | DEVICE D | D8 | T=844 |
| S14 | DEVICE D | D14 | T=846 |
| S15 | DEVICE D | D15 | T=846 |
| S16 | DEVICE D | | T=846 |
| S17 | DEVICE D | | T=844 |

FIG. 15C

METHOD AND SYSTEM FOR IMPLEMENTING A FILTER IN A DATA SYNCHRONIZATION SYSTEM

RELATED APPLICATIONS

This application is a continuation in part of U.S. application No. 09/928,609, filed Aug. 13, 2001, a continuation in part of U.S. application No. 09/208,815, filed Dec. 8, 1998 now U.S. Pat. No. 6,477,545; a continuation in part of U.S. application No. 09/289,551, filed Apr. 9, 1999 now U.S. Pat. No. 6,460,051,; a continuation in part of U.S. application No. 10/094,110, filed Mar. 8, 2002, and a continuation in part of U.S. application No. 09/679,944 filed Oct. 4, 2000 now U.S. Pat. No. 6,810,405 the disclosures of which are hereby incorporated by reference in their entirety, including any appendices or attachments thereof, for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to a synchronization system that synchronizes data between multiple datasets. More particularly, the invention relates to a method for such a synchronization system to filter or restrict the data that is synchronized between the datasets.

The prior art includes a number of different synchronization systems for synchronizing data between multiple datasets. For example, U.S. Pat. Nos. 5,727,202 and 5,710,922 disclose basic data synchronization systems, while U.S. Pat. Nos. 6,275,831, 6,295,541 and 6,401,104, all assigned to the assignee of this application, disclose more sophisticated synchronization systems. However, there is not much disclosure in the prior art related to filtering the data that is synchronized between the multiple datasets. U.S. Pat. Nos. 6,141,664 (the '664 patent) and 6,212,529 (the '529 patent) disclose the basic concept of filtering the data that is synchronized between multiple datasets. The '664 patent involves filtering dated records so that only records that fall within a specified date range are synchronized. The '529 patent involves filtering data records based on whether a text field of the data records matches a filter criterion. The '664 patent and the '529 patent generally disclose methods of applying a filter to each record of a dataset each time a synchronization is performed to determine which records are to be synchronized and which records are to be excluded from synchronization. If a record passes the filter, then it is synchronized between the datasets. If a record does not pass the filter, then the record is deleted from the dataset to which the filter applies.

The preferred embodiments in the '664 patent and the '529 patent are described in terms of a simple synchronization system involving a single synchronization engine and two databases. There is no mention in these specifications of the methods being applied to more complex synchronization environments, such as a scalable server-based synchronization system, which is capable of serving many different user accounts. Efficiency of data processing is advantageous in such systems, as well as in systems involving relatively large databases. A method is needed that provides better data processing efficiency, while maintaining data integrity.

BRIEF SUMMARY OF THE INVENTION

This invention comprises a system and method for synchronizing a dataset with one or more data subsets according to one or more data filters. The dataset may be a sync database in a synchronization server, where the synchronization server may also include a sync engine, a database manager, a mapping table and a filter. A data subset may be a device database in a client device, where the client device may also include a personal information manager and a sync client. One embodiment involves a two-way synchronization in which a client device sends fresh changes to a server and the server sends fresh changes back to the client device. One-way synchronizations may also be performed between the client device and the server. When the server receives incoming changes from the client device, the server may perform conflict and duplicate resolution on the received changes and apply the filter to the received changes, and propagate any surviving changes into the dataset. For any received add or update that fails the filter, the corresponding record in the dataset is marked as having a fresh change. The server may also apply the filter to outgoing changes that are to be sent to the client device. The outgoing changes and the dataset records may be modified in a manner that implements the filter. In one embodiment a mapping table is also modified to implement the filter. In one embodiment, if the outgoing change is an add that fails the filter, the add is canceled and the corresponding dataset record is marked as being excluded from the data subset; if the outgoing change is a delete and the dataset record had previously been excluded from the data subset, the delete is canceled; if the outgoing change is an update, the dataset record had previously been excluded from the data subset, and the outgoing change fails the filter, the update is canceled; if the outgoing change is an update, the dataset record had previously been excluded from the data subset, and the outgoing change passes the filter, the update is changed to an add; and if the outgoing change is an update, the dataset record had not previously been excluded from the data subset, and the outgoing change fails the filter, the update is changed to a delete. In one embodiment, if a record is to be deleted from the data subset because the record fails the filter, a delete is generated that is specially marked to indicate that the delete resulted from failing the filter, the specially marked delete is sent to the client device, the client device executes the record deletion and acknowledges the delete in a manner that indicates that the delete was specially marked in such a manner, and, upon receiving the acknowledgement at the dataset, the dataset record is marked as having been excluded from the data subset.

This invention also accommodates changes to the filter. A change in the filter may be processed immediately after the change is made, but without actually synchronizing the dataset and the data subset according to the changed filter. The synchronization system may be configured to automatically synchronize according to the changed filter during the next synchronization, without having to make any adjustments to account for the filter change during that next synchronization. In one embodiment, when the filter is changed, all records from the dataset that are not fresh with respect to the client device are considered. If such a dataset record was previously excluded from the data subset but now passes the changed filter, the record in the dataset is marked as a freshly added record. If such a dataset record was not previously excluded from the data subset but now fails the changed filter, the record in the dataset is marked as a fresh change. In another embodiment, all records from the dataset are retrieved. If a dataset record was previously excluded from the data subset, the record in the dataset is marked as a freshly added record. If a dataset record was not previously excluded from the data subset, the dataset record has not been deleted, and the dataset record has not been freshly added, the dataset record is marked as a fresh change.

BRIEF DESCRIPTION OF THE SEVERAL VIEWS OF THE DRAWING

FIG. 3A is a table that shows a portion of a data structure for a device database.

FIG. 3B is a table that shows a portion of a data structure for a sync database in a sync server.

FIG. 3C is a table that shows a portion of a mapping table in a sync server.

FIGS. 7A–7I form a table that shows a supposed sequence of events that are used to illustrate the operation of this invention, and actions that would be taken in response to the supposed events by a system implementing this invention.

FIGS. 8A–8C are tables that show the contents of a portion of a device database, a sync database and a mapping table, respectively, at a first time in the scenario of FIGS. 7A–7I.

FIGS. 9A–9C are tables that show the contents of a portion of a device database, a sync database and a mapping table, respectively, at a second time in the scenario of FIGS. 7A–7I.

FIGS. 10A–10C are tables that show the contents of a portion of a device database, a sync database and a mapping table, respectively, at a third time in the scenario of FIGS. 7A–7I.

FIGS. 11A–11C are tables that show the contents of a portion of a device database, a sync database and a mapping table, respectively, at a fourth time in the scenario of FIGS. 7A–7I.

FIGS. 12A–12C are tables that show the contents of a portion of a device database, a sync database and a mapping table, respectively, at a fifth time in the scenario of FIGS. 7A–7I.

FIGS. 13A–13C are tables that show the contents of a portion of a device database, a sync database and a mapping table, respectively, at a sixth time in the scenario of FIGS. 7A–7I.

FIGS. 14A–14C are tables that show the contents of a portion of a device database, a sync database and a mapping table, respectively, at a seventh time in the scenario of FIGS. 7A–7I.

FIGS. 15A–15C are tables that show the contents of a portion of a device database, a sync database and a mapping table, respectively, at an eighth time in the scenario of FIGS. 7A–7I.

DETAILED DESCRIPTION OF THE INVENTION

This invention can be implemented in a wide variety of systems that involve a wide variety of data types and a wide variety of types and quantities of data devices, interacting in any of a wide variety of configurations. This invention can function with virtually any type of data and in virtually any type of system that has multiple logical locations in which the data type can be stored. This invention can be implemented in any system that has at least two datasets, where a first dataset has copies of some of the data in a second dataset, but not all of the data in the second dataset, so that some of the data from the second dataset is filtered out, or excluded from the first dataset. It is also possible that the second dataset can have copies of some of the data in the first dataset, but not all of the data in the first dataset, so that some of the data from the first dataset is excluded from the second dataset as well. The invention can be implemented so long as there is a partial overlap, but not a complete overlap, of some type of data, between two or more datasets. The datasets may be located remotely from one another, in diverse data processing systems, or they may be located in the same data processing system, at the same location or at different locations, or they may even reside on the same device or computer system. The data may be stored in the same or in different formats in the multiple datasets. And if the datasets are stored in different devices, the devices may interface with each other by a wide variety of means, such as by various wired or wireless communication means. And the devices may be interconnected with one another in a wide variety of configurations. And the interconnections may be persistent, or not. However, for simplicity, the preferred embodiment will be described in terms of a particular data processing system, involving a particular type of data.

Figure 1:
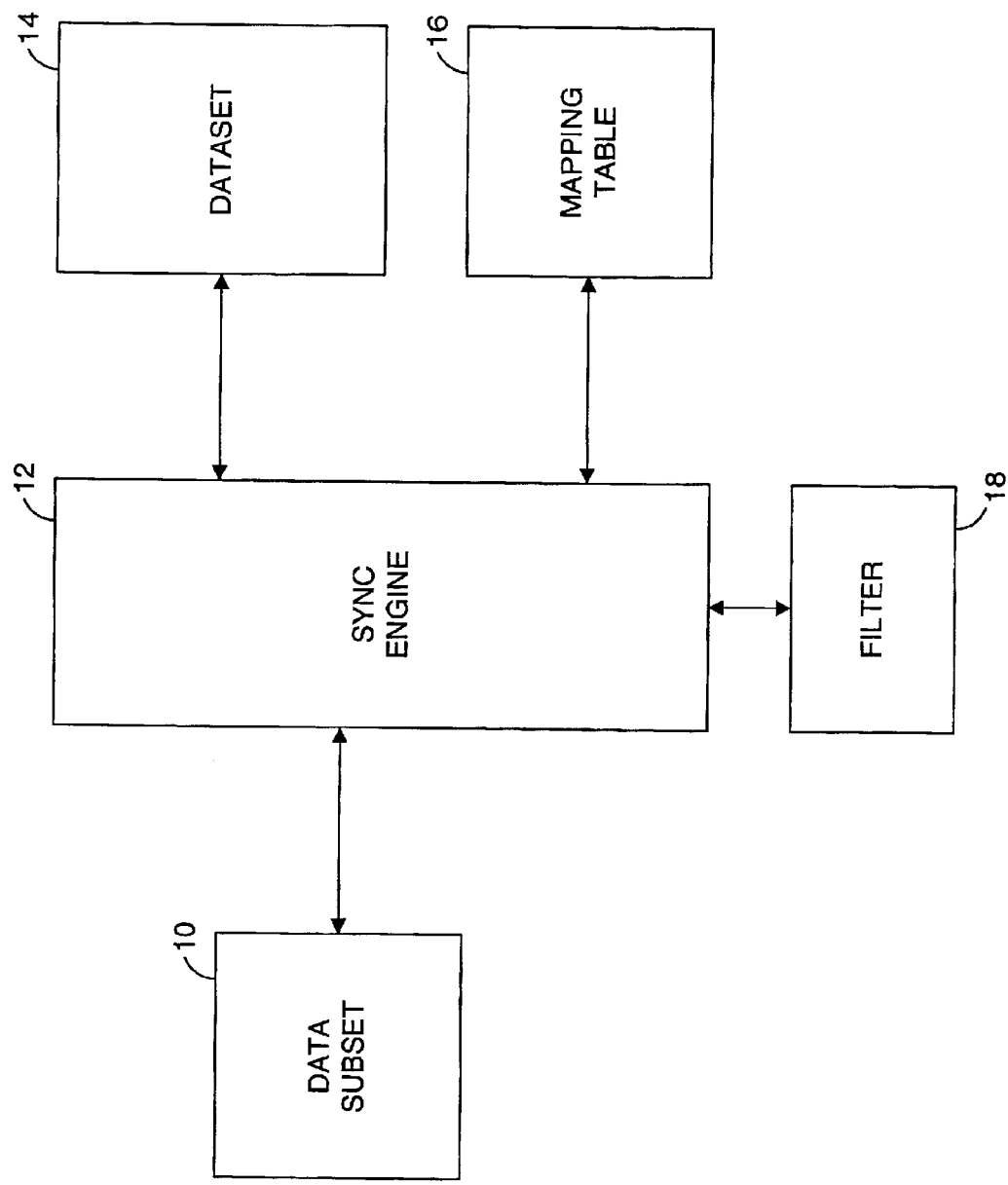
FIG. 1 is a functional block diagram of a basic synchronization system in which this invention may be implemented.

FIG. 1 is a functional block diagram of a basic synchronization system in which this invention may be embodied. The synchronization system comprises a data subset 10, a sync engine 12, a dataset 14, a mapping table 16 and a filter 18. The dataset 14 may contain a number of records of user data, such as personal information manager (PIM) data. The data subset 10 may contain a subset of the data that is contained in the dataset 14. The filter 18 specifies which data from the dataset 14 are to be included in the data subset 10. The filter 18 may comprise one or more parameters or rules that specify the restrictions on the data that are to be included in the data subset 10. For example, the filter 18 may indicate that the data subset 10 is to include only those calendar event data records of the dataset 14 that occur within the next week, or the filter 18 may indicate that the data subset 10 is to include only those contact data records of the dataset 14 that have a last name beginning with the letter 'R'.

The sync engine 12 performs a synchronization method to synchronize the data between the dataset 14 and the data subset 10, based on the restrictions of the filter 18. The sync engine 12 creates and maintains the mapping table 16 to store data related to the synchronization of the dataset 14 and the data subset 10. Each of the records of the dataset 14 preferably has a record identification number (record ID) that is unique among all of the records of the dataset 14. Also, each of the records of the data subset 10 preferably has a record ID that is unique among all of the records of the data subset 10. Bach of the records of the dataset 14 and the data subset 10 also preferably includes a date/timestamp, indicating when the record was last modified. The mapping table 16 preferably contains a number of records that indicate the correspondence between the record IDs of the dataset 14 and those of the data subset 10. The mapping table 16 may also contain information indicating the last time that each data record in the dataset 14 was synchronized with the data subset 10 and which of the records of the dataset 14 are included in or excluded from the data subset 10.

Figure 2:
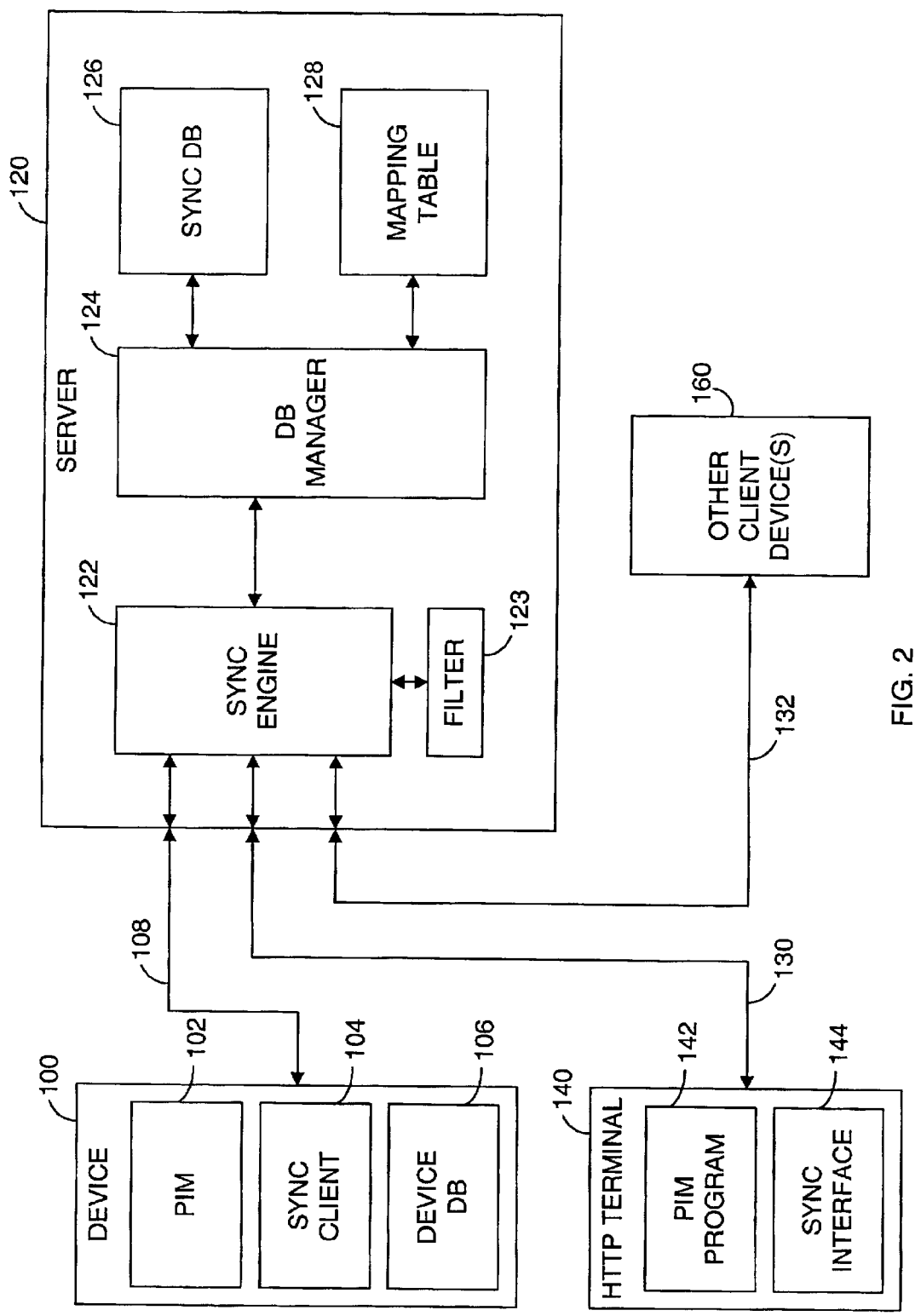
FIG. 2 is a functional block diagram of a PIM data synchronization system in which this invention may be implemented.

FIG. 2 is a functional block diagram of a more specific system in which this invention may be embodied. The system of FIG. 2 comprises a device 100, a server 120 and a Hypertext Transfer Protocol (HTTP) terminal 140. The device 100 can be, for example, a so-called smart phone, comprising a cellular telephone with a built in PIM application. The device 100 has a device database or dataset 106 that contains a user's PIM data, such as phone numbers, addresses, calendar entries, a to do list, memos and emails, along with a PIM application 102 to enable the user to access and store this PIM data. The server 120 can be an ordinary server computer connected to the Internet, and providing an Internet-based PIM service, such as TrueSync.com on the World Wide Web, which was created and is being hosted by Starfish Software, Inc., the assignee of this application. The server 120 has a sync database or dataset 126 that contains a user's PIM data. The server 120 may contain user data for many different users, providing a different user account for each user. This discussion, however, will focus on a single user account. A user may access his data in the server 120 using the HTTP terminal 140. The HTTP terminal 140 may be an ordinary personal computer, running an Internet browser. For example, the terminal 140 may be a standard desktop computer running a Windows operating system from Microsoft Corporation. The terminal 140 may contain a PIM program 142 that interacts with the sync database 126 to enable the user to access and store PIM data in the sync database 126.

A user may have a first set of PIM data stored on his handheld device 100 and a second set of PIM data stored on the server 120, which he accesses through his desktop computer 140. The user may want to synchronize these two datasets 106 and 126, so that they generally contain the same data. Methods for synchronizing data are described in various issued patents and pending patent applications that have been assigned to Starfish Software, such as U.S. Pat. Nos. 6,295,541, 6,275,831 and 6,401,104, and U.S. patent application Nos. 09/208,815, 09/289,551 and 09/679,944. Starfish Software also sells commercial products that perform such a synchronization of databases, such as TrueSync Desktop and TrueSync.com. TrueSync Desktop is an application that operates on a personal computer running Microsoft Windows, and provides a PIM and a synchronization engine. TrueSync Desktop can be used to synchronize data between a device that is attached to a port of the computer, various desktop applications that reside on the computer and one or more Internet-based PIM datasets, such as TrueSync.com. TrueSync.com provides an Internet-based PIM and synchronization engine. TrueSync.com can synchronize data between various devices that can interface with the Internet, including other server computers, desktop computers and handheld devices, including a wireless device, through a wireless connection such as described in commonly owned U.S. patent application No. 09/679,944, the disclosure of which has been incorporated by reference. The TrueSync.com server can also be implemented in a corporate intranet system.

The software that performs such a synchronization may be referred to as a sync engine. A sync engine 122 is shown in the server 120. The sync engine 122 interfaces with a sync client 104 in the device 100 to perform a synchronization between the sync database 126 and the device database 106. The terminal 140 also contains a sync interface 144 that enables a user to access the sync engine 122. For example, the user may set certain parameters within the sync engine 122 that control synchronizations between the sync database 126 and the device database 106. In particular, the user may use the terminal 140 to set or change a filter 123, through the sync engine 122. The sync engine 122 also maintains a mapping table 128, which contains information related to the synchronization between the two databases 106 and 126. The sync engine 122 interfaces with the sync database 126 and the mapping table 128 through a standard database manager 124, such as a standard database manager 124 from Oracle Corporation. The mapping table 128 and the sync database 126 may actually be two different parts of a single database. The computer system of FIG. 2 may also contain various other client devices 160. The other client devices 160 may comprise additional smart phones or any other data device or system that may operate as a client in a client-server synchronization system.

The device 100 is connected to the server 120 by an interface 108. The terminal 140 is connected to the server 120 by an interface 130. The other devices 160 are connected to the server 120 by one or more interfaces 132.

The device 100 may be any of a number of different devices that contain a PIM database, such as a PDA, a wireless telephone with a built-in PDA, a personal computer running a PIM application or a server computer running a PIM application, among other possibilities. The server 120 is preferably implemented in one or more server-type computers running server applications that provide both a sync engine 122 and a sync database 126. The interface 108 may be any one of a number of different possible interface types. In one embodiment, the interface 108 comprises a wireless network, such as a cellular telephone network, the Internet, and a protocol gateway to provide an interface between the cellular network and the Internet.

The HTTP terminal 140 may be a desktop personal computer running Microsoft Windows and a web browser application. In another embodiment, the functionality of the HTTP terminal 140 may be implemented in the device 100. For example, the device 100 may be a wireless telephone with a built-in PDA and a wireless application protocol (WAP) browser, along with a PIM program 142 for accessing the sync database 126 and a sync interface 144 for accessing various parameters of the sync engine 122, including the filter 123. When using a personal computer to implement the HTTP terminal 140, the interface 130 may be an Internet connection or another network connection, such as a local area network connection. The other client devices 160 may be a variety of different devices that contain a PIM database, such as the device database 106, and a sync client, such as the sync client 104. The interface 132 may be any of a wide variety of interfaces for connecting the other client devices 160 with the server 120. For example, the interface 132 may be the Internet.

The sync database 126 and the mapping table 128 may both be implemented in the same database, such as an Oracle database. The database manager 124 may be a conventional database manager, such as an Oracle database manager, providing standard functions for storing and accessing data in a database. The functionality of the PIM program 142 and the sync interface 144 may be implemented in the server 120, such as in the form of web pages that are accessed by a web browser on the HTTP terminal 140, such as in the case of TrueSync.com.

The device database 106 of FIG. 2 corresponds with the data subset 10 of FIG. 1. The sync engine 122 corresponds with the sync engine 12. The sync database 126 corresponds with the dataset 14. The mapping table 128 corresponds with the mapping table 16. And the filter 123 corresponds with the filter 18.

The device 100 may be a small, handheld device, such as a personal digital assistant (PDA) or a wireless telephone with a built-in PIM. Such devices 100 often have limited memory available for storing PIM data. The sync database 126, on the other hand, may have plenty of memory to store all of the PIM data that the user is interested in storing. If the sync database 126 contains more data than will fit in the device database 106, then the user cannot simply synchronize the two databases 106 and 126. Instead, the user may be given an option to synchronize the device database 106 with only a portion of the sync database 126. As an example, the user may be given an option to synchronize with the device database 106 all calendar entries stored on the sync database 126 that occur between two user-selected dates. The user may use the terminal 140 to specify and activate the filter 123, through the sync interface 144 and the sync engine 122. The sync engine 122 stores the filter 123 for future reference to determine what restrictions are to be placed on the data that is to be downloaded to and maintained in the device 100. The sync engine 122 may maintain a different filter 123 for each user account in the sync database 126 and for each device 100, 160 associated with each user account. The sync engine 122 may also maintain multiple filters 123 for one particular device 100. Some of these multiple filters 123 may relate to different data types, so that they may be used simultaneously. For example, the device 100 may contain all calendar entries that occur in the month of June and all contact entries for which the last name begins with 'Z'. Also, some of the multiple filters 123 may be used at different times for the same data types, so that the user may activate different filters 123 at different times. For example, a user may have two different filters for selecting two different sets of data for synchronization with the device 100, one filter and set of data for when the user is traveling and the other filter and set of data for when the user is not traveling. In this case, the user may simply switch between the two filters, depending on whether the user is traveling or not.

As mentioned previously, the filter 123 may indicate that only calendar entries that fall between two user-selected dates are to be synchronized with the device 100. In this case, the calendar entries that fall outside of the two user-selected dates will be maintained in the sync database 126, but they will not be downloaded to the device 100. The data that fall outside the user-selected dates are said to fail (or not pass) the filter 123, and such data are said to be "filtered-out" of the device database 106. The data that passes the filter 123 and is synchronized between the two databases will be referred to as "included" data, while data that fails the filter 123 and is not downloaded to the device 100 will be referred to as "excluded" data. Also, if the device 100 already contains a calendar entry that falls outside of the user-selected dates, the sync engine 122 may delete this entry from the device database 106. Alternatively, the sync engine 122 may leave any data that already exists in the device database 106 but that does not pass the filter 123, but the sync engine 122 would not download any new data to the device 100 if the data does not pass the filter 123. In the preferred embodiment, the data that already resides in the device 100, but which does not pass the filter 123, is deleted from the device 100.

The user may also be given an opportunity to change the parameters of the filter 123 that determine which data will be downloaded to the device 100. For example, the user may first set the filter 123 to download to the device 100 all calendar entries that occur between April $1^{st}$ and May $31^{st}$, so that all entries that occur before April $1^{st}$ or after May $31^{st}$ are excluded from the device 100. Later, the user may set the filter 123 to download to the device 100 all calendar entries that occur between May $1^{st}$ and June $30^{th}$. The filter 123 will be stored by the sync engine 122 in the form of a number of parameters. The user may access and change these parameters by using the sync interface 144 in the terminal 140. After the filter 123 is changed, when the next synchronization is initiated, the sync engine 122 must apply the new filter 123 and undo the effects of the previous filter 123. Some data that was excluded by the first set of parameters of the filter 123 will now be included based on the second set of parameters of the filter 123, such as entries occurring in the month of June in this example. On the other hand, other data that was included based on the first set of parameters will now be excluded based on the second set of parameters, such as entries occurring in the month of April in this example. Thus, upon switching from the first set of parameters to the second set of parameters, and then upon the next synchronization between the sync database 126 and the device 100, calendar entries occurring in April will be deleted from the device 100, while entries occurring in June will be added to the device 100.

As described above, the server 120 may provide online PIM accounts to a large number of users. And each of the accounts could contain a large amount of user data. Accordingly, the sync engine 122 may consume extensive processing resources in processing a myriad of substantially simultaneous user actions related to their different user accounts. For example, a first user may be adding new data to his account within the sync database 126 using an HTTP terminal 140, while a second user is performing a synchronization between a device 100 and his account in the sync database 126, while a third user may be changing the parameters of his filter 123, using another terminal 140. Multiplying each of these actions by the thousands of users that can be accessing the server 120 simultaneously shows that a large amount of processing resources may be needed to implement a server 120. Of course, companies that intend to provide a server 120 will want to stretch their processing resources to handle more users and more user data. Accordingly, it is advantageous to have efficient sync operations in such a server 120. Thus, one object of this invention is to implement data filtering and to accommodate filter changes in an efficient manner. As will be described in greater detail below, a change in the filter 123 requires a determination of which records that previously failed the filter 123 now pass the filter 123 and which records that previously passed the filter 123 now fail the filter 123. Such a determination can consume substantial processing resources, depending on the method that is used to make the determination and the quantity of data in the sync database 126.

FIG. 3A is a table indicating a portion of the data structure of the device database 106. The device database 106 comprises a plurality of data records 410. For each of the data records 410, the device database 106 preferably comprises a record ID 402, a plurality of record data 404 and a mod time 406. The record ID 402 for a given data record 410 is preferably unique among all the record IDs 402 in the device database 106. The record data 404 preferably comprises a plurality of data fields. For example, if the data record 410 is a contact record, the record data 404 may comprise different fields for a last name, a first name, a home telephone number and a business telephone number, among other possible fields. The mod time 406 comprises a date timestamp value that indicates, according to the internal clock of the device 100, the time at which the last modification to the data record 410 was stored in the device database 106.

FIG. 3B is a table indicating a portion of the data structure of the sync database 126. The :sync database 126 comprises a plurality of data records 440. For each of the data records 440, the sync database 126 preferably comprises a server record ID 432, a plurality of record data 434 and a mod time 436. The record ID 432 for a given data record 440 is preferably unique among all the record IDs 432 in the sync database 126. The record data 434 preferably comprises a plurality of data fields. For example, if the data record 440 is a contact record, the record data 434 may comprise different fields for a last name, a first name, a home telephone number and a business telephone number, among other possible fields. The mod time 436 comprises a date timestamp value that indicates, according to the internal clock of the server 120, the time at which the last modification to the data record 440 was stored in the sync database 126.

FIG. 3C is a table indicating a portion of the mapping table 128. The mapping table 128 comprises a plurality of mapping records 470. For each mapping record 470, the mapping table 128 comprises a server record ID 462, a user ID 463, a device ID 464, a client record ID 466 and a sync time 468. Each user account in the server 120 will have a unique user ID 463. This discussion will focus on a single user account of the server 120, and the user ID 463 is assumed to be that of the user of the device 100. Each data record 440 in the sync database 126 can have a separate mapping record 470 for each of the client devices 100, 160 with which the data record 440 has been synchronized. Thus, for example, if a first data record 440 of the sync database 126 has a server record ID 432 of S0 and has been synchronized with the device 100 and a first other client device 160, assuming that both devices 100, 160 belong to the same user with a single user account, then the mapping table 128 will have two mapping records 470 corresponding to this first data record 440. Both of those mapping records 470 will have the value S0 stored in its server record ID field 462. A first of these two mapping records 470 will have a value in its device ID field 464 that identifies the device 100. This first mapping record 470 will have in its client record ID field 466 the same value that is in the record ID field 402 of the device database 106 for the data record 410 that corresponds with this first data record 440. This first mapping record 470 will have in its sync time field 468 a value that indicates the most recent time at which the first data record 440 was synchronized with the device 100. The second of these two mapping records 470 will contain similar values relative to the first other client device 160. Specifically, this second mapping record 470 will have a value in its device ID field 464 that identifies the first other client device 160. This second mapping record 470 will have in its client record ID field 466 a value that identifies the data record in the first other client device 160 that corresponds with the first data record 440. This second mapping record 470 will have in its sync time field 468 a value that indicates the most recent time at which the first data record 440 was synchronized with the first other client device 160. Both of these mapping records 470 will have in their user ID fields 463 the user ID for the user that owns the devices 100, 160.

The device database 106, the sync database 126 and the mapping table 128 may also contain various other information, such as some or all of the information described in the incorporated U.S. patent application Nos. 09/289,551 and 10/094,110.

Figure 4A:
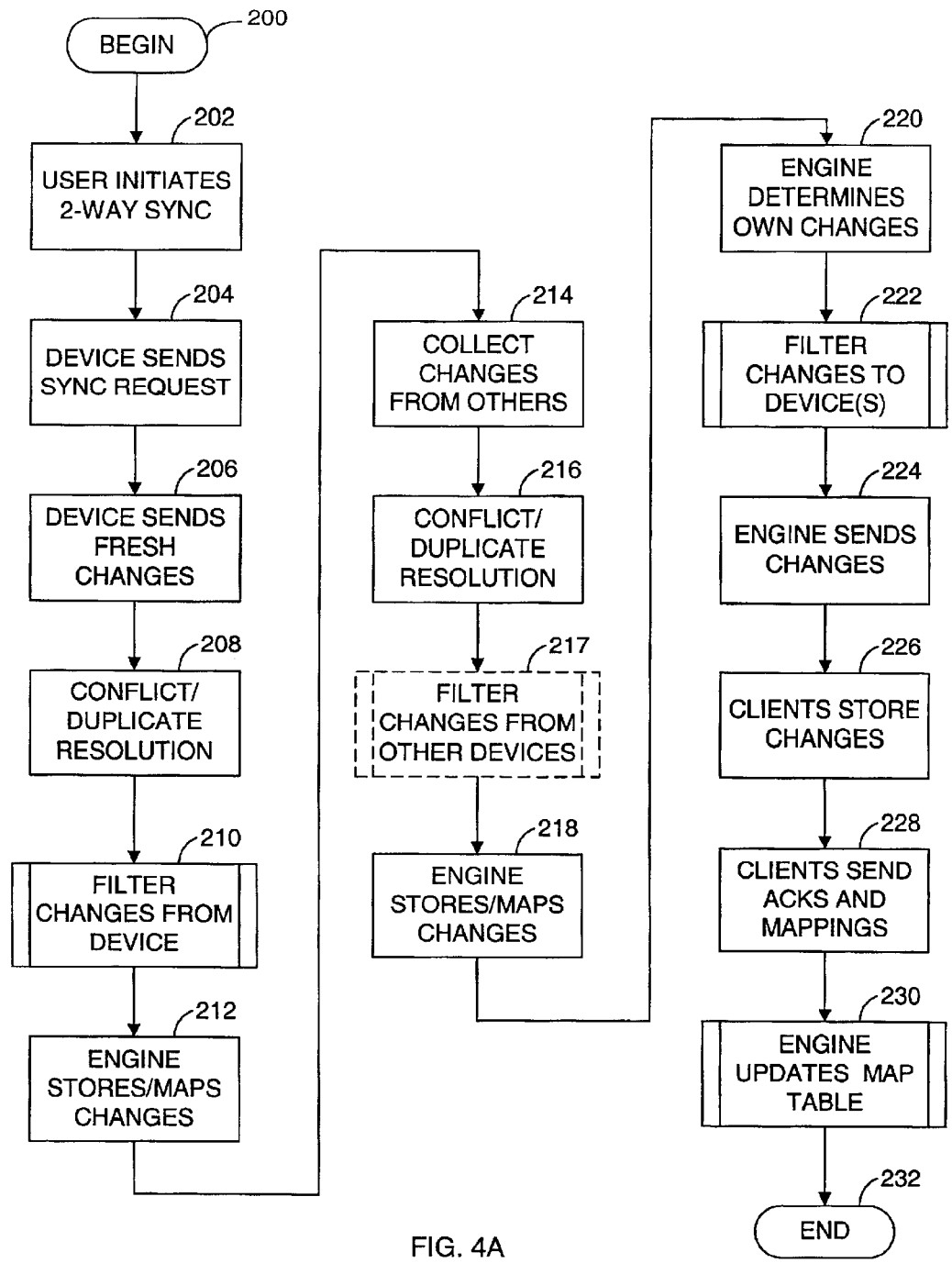
FIG. 4A is a flowchart of a synchronization process implementing the filtering method of this invention.

FIG. 4A is a flowchart illustrating a method that may be performed by the sync engine 122 and the sync client 104 to synchronize the sync database 126 with the device database 106, based on the restrictions indicated by the filter 123, along with optionally synchronizing the sync database 126 and the device database 106 with other client devices 160. Various other methods may also be performed to synchronize data between the sync database 126 and the device database 106. For example, one or more one-way synchronizations may be performed in which changes are sent from the device database 106 to the sync database 126, and one or more independent, one-way synchronizations may be performed in which changes are sent from the sync database 126 to the device database 106. The method of FIG. 4A begins with an initial block 200. At a process block 202, the user of the device 100 initiates a synchronization between the device 100 and the server 120, for example by pressing a synchronization button on the device 100 or by selecting a synchronization function from a menu on the device 100. Upon detection of the user's initiation of a synchronization by the sync client 104, the sync client 104 sends a sync request command to the sync engine 122, at a process block 204. At a process block 206, the sync client 104 sends to the sync engine 122 all of its fresh changes. Fresh changes generally include any changes to the device database 106 that are to be synchronized with the sync database 126, or with any of the other devices 160. Generally fresh changes mean any changes that have been made to the device database 106 since the last time that a synchronization was performed between the device database 106 and the sync database 126. A change may be an addition of a new data record, or a modification to or deletion of an existing data record. Fresh changes are also described in the incorporated applications.

After receiving the fresh changes from the sync client 104, the sync engine 122 performs conflict and duplicate resolution on the received changes, as indicated in a process block 208. Conflict and duplicate resolution may be performed according to various methods, including those described in the incorporated U.S. patent application Nos. 09/928,609, 09/289,551 and 09/679,944. In very general terms, if corresponding data in different databases have been changed in an inconsistent manner, then the more recent change is preferably accepted and propagated to other databases, while the other change(s) is rejected and ignored. In one embodiment, conflict and duplicate resolution is performed on each change as it is received from either the device 100 or the other client devices 160 as described in U.S. patent application No. 09/679,944. Only changes that pass conflict and duplicate resolution are propagated into the sync database 126, so that the sync database 126 is always conflict free with respect to all changes known to the sync engine 122.

At a process block 210, the sync engine 122 applies the filter 123 to the changes received from the device 100. The process block 210 is specified in greater detail in FIG. 4B. In the process block 210, if an add or update received from the device 100 does not pass the filter 123, the sync time 468 of the corresponding mapping record 470 will be nulled, by e.g. setting the value to zero. For a delete from the device 100, or for an add or update that passes the filter 123, the process block 210 will have no effect. At a process block 212, the sync engine 122 propagates the changes that survive conflict/duplicate resolution into the sync database 126, using the database manager 124. Thus, if a surviving change is an add, a new, corresponding record will be added to the sync database 126; if a surviving change is an update, the corresponding record in the sync database 126 will be updated accordingly; and if a surviving change is a delete, the corresponding record in the sync database 126 will be deleted (or at least modified to indicate a logical deletion). Also in the process block 212, the sync engine 122 updates the mapping table 128, using the database manager 124, to reflect the changes made to the sync database 126 in response to the changes received from the device 100. For an add, a new mapping record 470 will be added to correlate the record ID 432 of the new record 440 in the sync database 126 with the record ID 402 of the corresponding record 410 in the device database 106. The sync time 468 will also be updated for each record 470 that is affected by the synchronization. However, if the change is an add or an update that does not pass the filter 123, as applied in the step 210, then the corresponding sync time 468 will be nulled during this step 212, as required by the step 210. Otherwise, the corresponding sync time 468 will be updated with the current date/timestamp, according to the clock of the server 120.

At a process block 214, the sync engine 122 requests and receives fresh changes from all other client devices 160 that are configured and available for synchronization with the device 100. Again, the fresh changes include those changes that are to be synchronized with the sync database 126. At a process block 216, the sync engine 122 performs conflict and duplicate resolution on the changes received from the other client devices 160 in the same manner as that described above relative to the process block 208. At a process block 217, the sync engine 122 applies other filters 123, if there are any, to the changes received from the other devices 160 in the same manner as described above relative to the step 210. At a process block 218, the sync engine 122 propagates the changes from the other devices 160 that survive the conflict/duplicate resolution into the sync database 126, as described above relative to step 212. The sync engine 122 also updates the mapping table 128 as described above relative to the step 212.

At a process block 220, the sync engine 122 determines changes in the sync database 126 that are fresh relative to the device 100 and the other devices 160. A change is fresh relative to the device 100 if it is to be synchronized with that database 106, generally because it has not yet been synchronized with the database 106. A change may be fresh relative to some devices 100, 160, but not with respect to others. For example, if a change was just received from a device 160 and that change had just been manually entered into that device 160, then it will be fresh relative to all of the other devices 160 and relative to the device 100, but not relative to the device 160 from which the change was received. Generally fresh changes are new records that have been added since the last relevant synchronization or updates or deletions that have been made to existing records since the last relevant synchronization. If the sync engine 122 keeps track of mod times 436 and sync times 468, as depicted in FIGS. 3B and 3C, then a record 440 is generally fresh relative to the device 100, for example, if the mod time 436 for the record 440 is more recent than the sync time 468 of the mapping record 470 having the server record ID 462 of the record 440 and the appropriate user ID 463 and device ID 464. In some systems, however, a newly added record 440 may not have a mapping record 470 until after it is synchronized with the device 100. In this case, the fact that there is no mapping record 470 may be used as an indication that the record 440 should be added to the device database 106. The sync engine 122 may make one or more calls to the database manager 124, requesting records 440 that meet appropriate criteria, so that only those records 440 that should be synchronized with the devices 100, 106 are returned by the database manager 124. For example, to determine changes that are fresh relative to the device 100, the sync engine 122 can request records 440 from the database manager 124 (a) for which there is no corresponding mapping record 470 or (b) for which the mod time 436 is more recent than the corresponding sync time 468 (note that any mod time 436 will be considered more recent than a null or zero sync time 468). Such a request for fresh records 440 is preferably limited by other criteria too, such as the appropriate user ID 463, device ID 464, type of data to be synchronized and folders or other data subsets to be synchronized. If there is no corresponding mapping record 470, the record 440 is treated as a new data record 440 that has been added since the last synchronization with the device 100. For records 440 for which the mod time 436 is more recent than the corresponding sync time 468, if the record 440 is indicated to be logically deleted, then the record 440 is treated as having been deleted since the last synchronization with the device 100; otherwise, the record 440 is treated as having been modified since the last synchronization. Other database calls are made for each of the other devices 160, but with the appropriate device IDs 464. So, after the process block 220, the sync engine 122 will have all changes that are to be made to each of the devices 100, 160.

At a process block 222, the sync engine 122 applies the filter 123 to the changes that are to be made to the device 100. If there are filters 123 that apply to one or more of the other devices 160, then the sync engine 122 applies these other filters 123 to the changes to be made to the respective other devices 160 in the same manner. The following description will, however, assume that there are no filters 123 that apply to the other devices 160. The process of the block 222 is specified in more detail in FIG. 4C. The process of the block 222 will have various effects on the changes to be made to the device 100 and on the corresponding record 470 in the mapping table 128, depending on whether the change is an add, a delete or an update, whether or not the corresponding record 440 was excluded from the device database 106 during the last synchronization, and whether or not the record 440 passes the current filter 123.

At a process block 224, the sync engine 122 sends all changes that have survived conflict and duplicate resolution and the application of the filter 123 to the device 100 and to the other client devices 160. At a process block 226, the device 100 and the other client devices 160 add new data records 410 or update or delete existing data records 410, in response to change messages received from the sync engine 122. Upon adding a new data record 410, the device 100 and the other client devices 160 will generate a mapping message to be sent to the sync engine 122, to inform the sync engine 122 of the record ID 402 that was assigned to the newly added data record 410. At a process block 228, the device 100 and the other client devices 160 send any such mapping messages, along with acknowledge messages for all updates and deletions, to the sync engine 122. Upon receiving mapping messages and acknowledge messages from the device 100 or the other client devices 160, the sync engine 122 updates the mapping table 128 at a process block 230. The process of the block 230 is described in greater detail below in connection with FIG. 4D. The method of FIG. 4A ends at a terminal block 232.

Figure 4B:
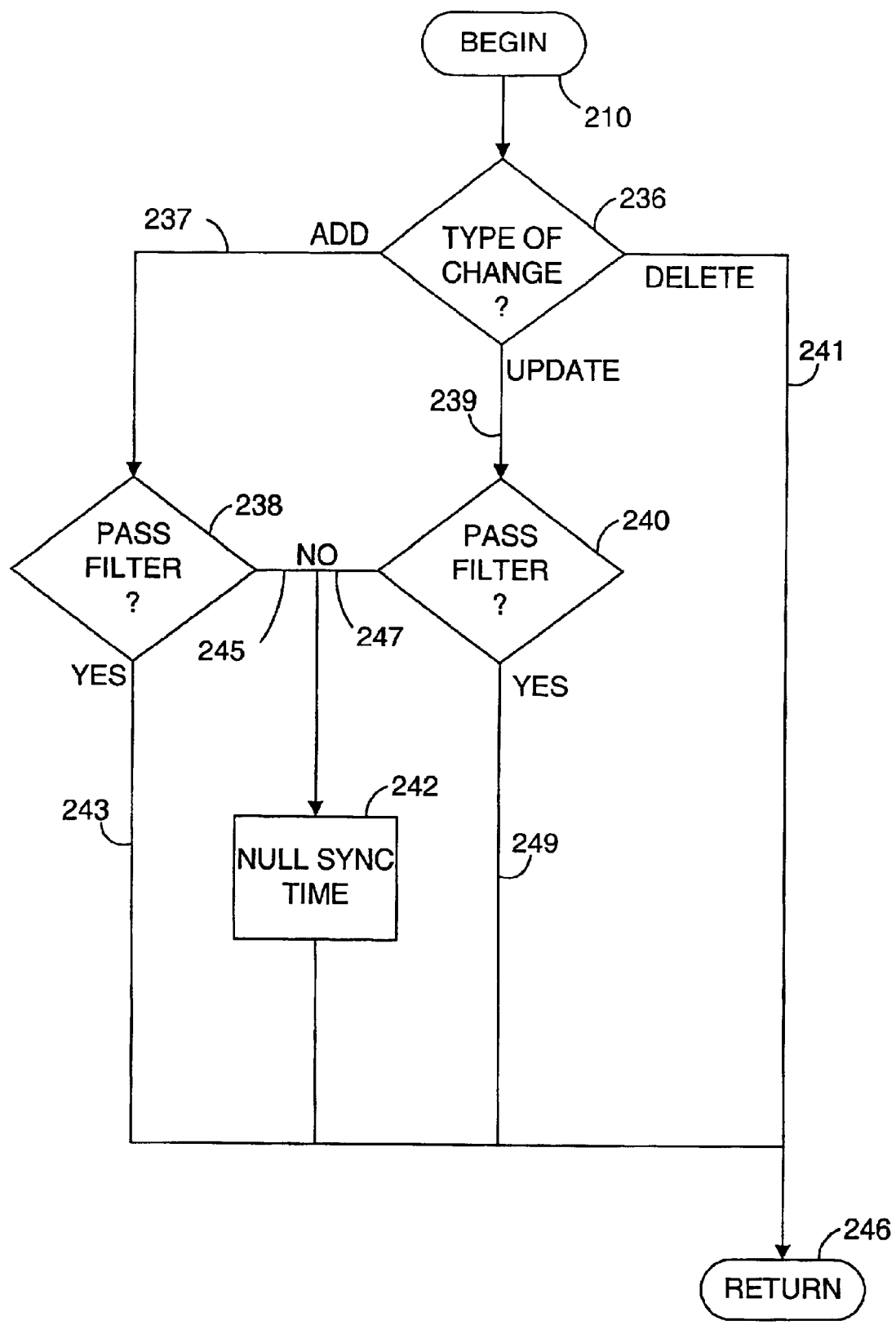
FIG. 4B is a flowchart of a method for applying a filter to changes received from a device by a sync engine.

FIG. 4B is a flowchart illustrating the process implemented in the process block 210, or the process block 217, of FIG. 4A. This is the process that is performed to apply the filter 123 to changes that are received from the device 100, or the devices 160, by the sync engine 122. The process of FIG. 4B is executed once for each change that is received. The process of FIG. 4B is shown starting at an initial block 210. The process then proceeds to a decision block 236. At the decision block 236, the sync engine 122 determines the type of change being considered. If the change is an add, the process proceeds to a decision block 238, along a path 237; if the change is an update, the process proceeds to a decision block 240, along a path 239; and if the change is a delete, the process proceeds to a terminal block 246, along a path 241. At the terminal block 246, the process returns to the method of FIG. 4A at the process block 212, or at the process block 218.

At the decision block 238, the sync engine 122 determines whether the change passes the current filter 123. If the change passes the filter 123, then the process proceeds to the terminal block 246, along a path 243. Otherwise, the process proceeds to a process block 242, along a path 245. Similarly, at the decision block 240, the sync engine 122 also determines whether the change passes the current filter 123. If the change passes the filter 123, then the process proceeds to the terminal block 246, along a path 249. Otherwise, the process proceeds to the process block 242, along a path 247. At the process block 242, the sync time 468 of the corresponding mapping table record 470 is nulled. As indicated above, the nulling of the sync time 468 actually occurs at the process block 212, or at the process block 218 of FIG. 4A, after the determination is made in this process 210 to null the sync time 468. After the process block 242, the process proceeds to the terminal block 246.

Figure 4C:
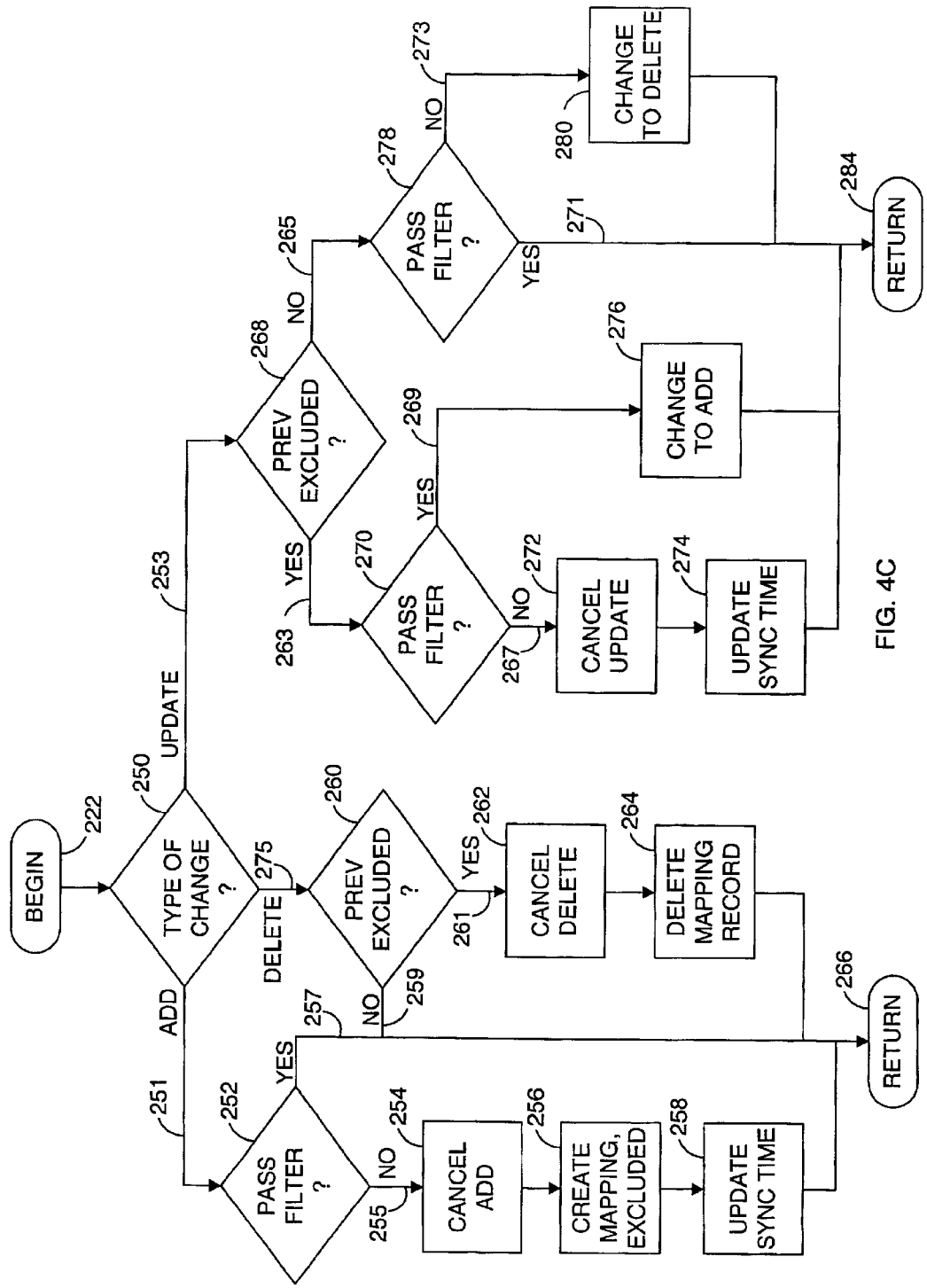
FIG. 4C is a flowchart of a method for applying a filter to changes that are to be sent from a sync engine to a client.

FIG. 4C is a flowchart illustrating the process implemented in the process block 222 of FIG. 4A. This is the process that is performed to apply the filter 123 to changes that are to be sent to the device 100, for example, by the sync engine 122. The same process is performed in the same manner for changes that are to be sent to the other devices 160, but this discussion will cover the application of the process to changes to be sent to the device 100. The process of FIG. 4C is executed once for each change that is to be sent to the device 100. The process of FIG. 4C is shown starting at an initial block 222. The process then proceeds to a decision block 250. At the decision block 250, the sync engine 122 determines the type of the current change that is under consideration. If the change is to add a record 440 that exists in the sync database 126 as a new record 410 to the device 100, the process proceeds to a decision block 252, along a path 251. If the change is to delete an existing record 410 from the device 100, the process proceeds to a decision block 260, along a path 275. If the change is to update an existing record in the device 100, the process proceeds to a decision block 268, along a path 253.

At the decision block 252, the sync engine 122 applies the filter 123 to the change to see if the change passes the filter 123. If the change passes the filter 123, the process proceeds to a terminal block 266, along a path 257. Otherwise, the process proceeds to a process block 254, along a path 255. At the terminal block 266, the process of the block 222 ends and the sync engine 122 returns to the process block 224 of FIG. 4A to resume execution.

At the process block 254, the sync engine 122 cancels the change under consideration, so that the new record 410 will not be added to the device 100. Next, at a process block 256, the sync engine 122 creates a new mapping record 470 for the record 440 that was to be added to the device 100. The server record ID field 462 of the mapping record 470 is filled in with the server record ID 432 for the record 440 that was to be added to the device 100. The user ID of the user of the device 100 is entered into the user ID field 463 of the record 470. The device ID of the device 100 is entered into the device ID field 464 of the record 470. However, in the preferred embodiment, the client record ID field 466 is set to zero because the record 440 will not be added to the device 100, and so there is no client record ID 466 to which the record 440 can be mapped. In the preferred embodiment, the sync engine 122 can determine that a record 440 has been excluded from the device 100 because of the filter 123 by determining that a mapping record 470 exists for the record 440, but that the client record ID field 466 is set to zero. Next, at a process block 258, the sync time field 468 of the mapping record 470 that was created in the process block 256 is updated with the current date/time clock value of the sync engine 122. After the process block 258, the process proceeds to the terminal block 266.

At the decision block 260, the sync engine 122 determines whether the record 440 that is to be deleted from the device 100 was excluded from the device 100 during a most recent prior synchronization, based on a previous application of the filter 123. The sync engine 122 makes this determination by finding the mapping record 470 for the record 440 to be deleted, having the correct user ID 463 and device ID 464, and checking the client record ID field 466. If the client record ID field 466 has a non-zero value, then the record 440 has not been excluded from the device 100. Otherwise, if the client record ID field 466 has a zero value, then the record 440 has been excluded from the device 100. If the mapping table 128 does not have a mapping record 470 with the correct values in the server record ID field 462, the user ID field 463 and the device ID field 464, then the record 440 has generally not yet been synchronized, or even considered for synchronization, with the device 100. This situation may arise if the record 440 has been both added to the sync database 126 and deleted from the sync database 126 since the last synchronization with the device 100. In this event, a change would not be generated for deleting the record 440 from the device 100. Returning to the operation of the decision block 260, if the record 440 to be deleted from the device 100 was not previously excluded from the device 100, then the process proceeds to the terminal block 266, along a path 259. If the record 440 was previously excluded, then the process proceeds to a process block 262, along a path 261. At the process block 262, the sync engine 122 cancels the change under consideration, so that the device 100 will not be instructed to delete the record 440 from the device database 106. Next, at a process block 264, the sync engine 122 deletes the mapping record 470 for the record 440. Then the process proceeds to the terminal block 266.

At the decision block 268, the sync engine 122 determines whether the record 440 that is to be updated was excluded from the device 100 during the most recent prior synchronization, based on a previous application of the filter 123. The sync engine 122 makes this determination as described above in connection with the decision block 260. If the record 440 has been excluded, the process proceeds to a decision block 270, along a path 263. If the record 440 has not been excluded, the process proceeds to a decision block 278, along a path 265. At the decision block 270, the sync engine 122 determines whether the record 440 passes the filter 123, as described above in connection with the decision block 252. If the record 440 passes the filter 123, the process proceeds to a process block 276, along a path 269. Otherwise, the process proceeds to a process block 272, along a path 267. At the process block 272, the change is canceled. In this case, there is no record 410 in the device database 106 that corresponds to the record 440 in the sync database 126 because the record 440 was previously excluded from the device 100, and the updated record 440 does not pass the current filter 123, so the record 440 will remain excluded from the device 100. In this situation, there is nothing that needs to be done with respect to the update, as it relates to the device 100. However, the process proceeds to a process block 274, where the sync time 468 of the mapping record 470 corresponding to the record 440 is updated with the current date/time value of the internal clock of the sync engine 122. This updating of the sync time 468 is to indicate that the device database 106 is upto-date with the sync database 126 with respect to this record 440, so that another change is not generated with respect to this record 440 during the next synchronization, unless there is some other reason for such a change. After the process block 274, the process proceeds to a terminal block 284. The terminal block 284 is functionally the same as the terminal block 266. At the process block 276, the change to the record 440 is modified from an update to an add. The path 269 is reached in the situation where a record 440 was previously excluded from the device 100 because of the filter 123, but the record 440 now passes the filter 123. In this case, an update cannot be sent to the device 100 because there is no corresponding record 410 in the device database 106 because the record 440 was previously excluded. So, instead, an add is sent to the device 100, so that the sync client 104 adds a new record 410 to the device database 106 that corresponds to the record 440. After the process block 276, the process proceeds to the terminal block 284. At the decision block 278, the sync engine 122 determines whether the record 440 passes the filter 123, as described above in connection with the decision block 252. If the record 440 passes the filter 123, the process proceeds to the terminal block 284, along a path 271. Otherwise, the process proceeds to a process block 280, along a path 273. The path 271 is reached if the record 440 was not previously excluded from the device 100, so that the device database 106 should have a record 410 that corresponds to the record 440, so that the update can proceed normally. There is nothing special that needs to be done as a result of applying the filter 123. The path 273 is reached if the record 440 was not previously excluded from the device 100, but the record 440 is now to be excluded because it fails the filter 123. Thus, there should be a record 410 that corresponds to the record 440, which should now be deleted from the device database 106. Thus, at the process block 280, the update to the record 440 is changed to a deletion of the corresponding record 410 in the device database 106. In the preferred embodiment, the change is specially marked as a deletion that resulted from failing application of the filter 123. This way, after the delete is sent to the device 100, the device 100 will acknowledge the deletion in a way that conveys back to the sync engine 122 the fact that the deletion was caused by the record 440 failing the filter 123. Upon receiving this particular type of deletion acknowledgement, the sync engine 122 can mark the record 440 as having been excluded from the device database 106. As an alternative, the record 440 could be marked as excluded at this point. Next, the process proceeds to the terminal block 284.

Figure 4D:
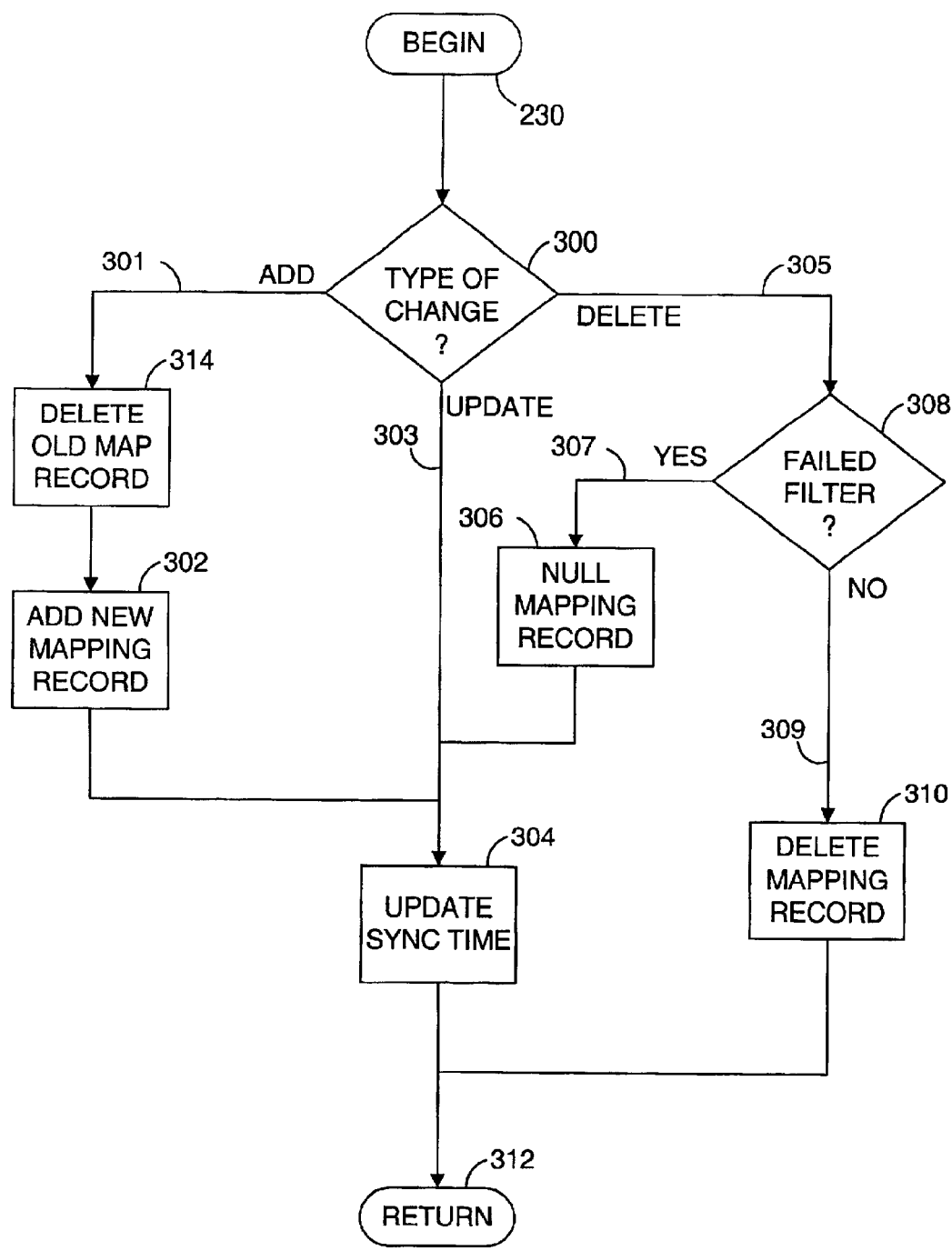
FIG. 4D is a flowchart of a method for updating a mapping table in a sync server upon receiving change acknowledgements and mapping messages from a device.

FIG. 4D is a flowchart illustrating the process implemented in the process block 230 of FIG. 4A. This process updates the mapping table 128 upon receiving acknowledgements of the receipt of an update message or a deletion, or upon receiving a mapping message in response to an add of a record 410. The process is shown to begin at an initial step 230. At a process block 300, the sync engine 122 determines whether the response from the device 100, 160 was to an add, an update or a delete. If the change was an add, then the process proceeds to a process block 314, along a path 301. If the change was an update, the process proceeds to a process block 304, along a path 303. If the change was a delete, the process proceeds to a decision block 308, along a path 305. At the process block 314, the sync engine 122 checks to see if there is a corresponding mapping record 470. If there is, the sync engine 122 deletes it. After the process block 314, the process proceeds to a process block 302. Generally, there would be a corresponding mapping record 470, with a nulled client record ID 466, if the record 440 had previously been excluded from the device 100, but now passes the filter 123. If the record 440 were an ordinary new add to the device 100, there would be no corresponding mapping record 470 and the process would proceed directly to the process block 302. At the process block 302, the sync engine 122 creates a new mapping record 470 that maps the newly added data record 410 between the device 100, 160 sending the mapping message and the server 120, using the record ID 402 reported in the mapping message and the server record ID 432 of the corresponding data record 440. After the process block 302, the process proceeds to the process block 304. At the decision block 308, the sync engine 122 determines whether the deletion that was sent to the device 100, 160 was caused by the record 440 failing an application of the filter 123. In the preferred embodiment, the acknowledgement from the device 100, 160 indicates whether the deletion was caused by failing the filter 123, as described above relative to the process block 280 of FIG. 4C. As an alternative, the record 440 may already be marked as excluded in the mapping table 128, by, for example, having a nulled client record ID 466, and the sync engine 122 can check this client record ID 466 to determine whether the deletion was caused by failing the filter 123. If the deletion was caused by failing the filter 123, the process proceeds to a process block 306, along a path 307. Otherwise, the process proceeds to a process block 310, along a path 309. At the process block 306, the sync engine 122 nulls the client record ID 466 of the mapping record 470 corresponding to the record 440 to indicate that the record 440 has been excluded from the device database 106. In the alternative embodiment where the client record ID 466 was nulled back when it was determined that the record 440 failed the filter 123, the process block 306 is not executed. After the process block 306, the process proceeds to the process block 304. At the process block 304, the sync time 468 for the relevant mapping record 470 is updated according to the current date/time clock of the sync engine 122. After the process block 304, the process proceeds to a terminal block 312. At the process block 310, the sync engine 122 deletes the corresponding mapping record 470 from the mapping table 128. In this case, the record 410 was deleted from the device database 106 because it had already been logically deleted from the sync database 126. In this case, there is no longer any need for the mapping record 470. After the process block 310, the process proceeds to the terminal block 312. The process of FIG. 4D, and therefore the process of the process block 230, terminates at the terminal block 312, and the process of FIG. 4A resumes after the process block 230.

Figure 5:
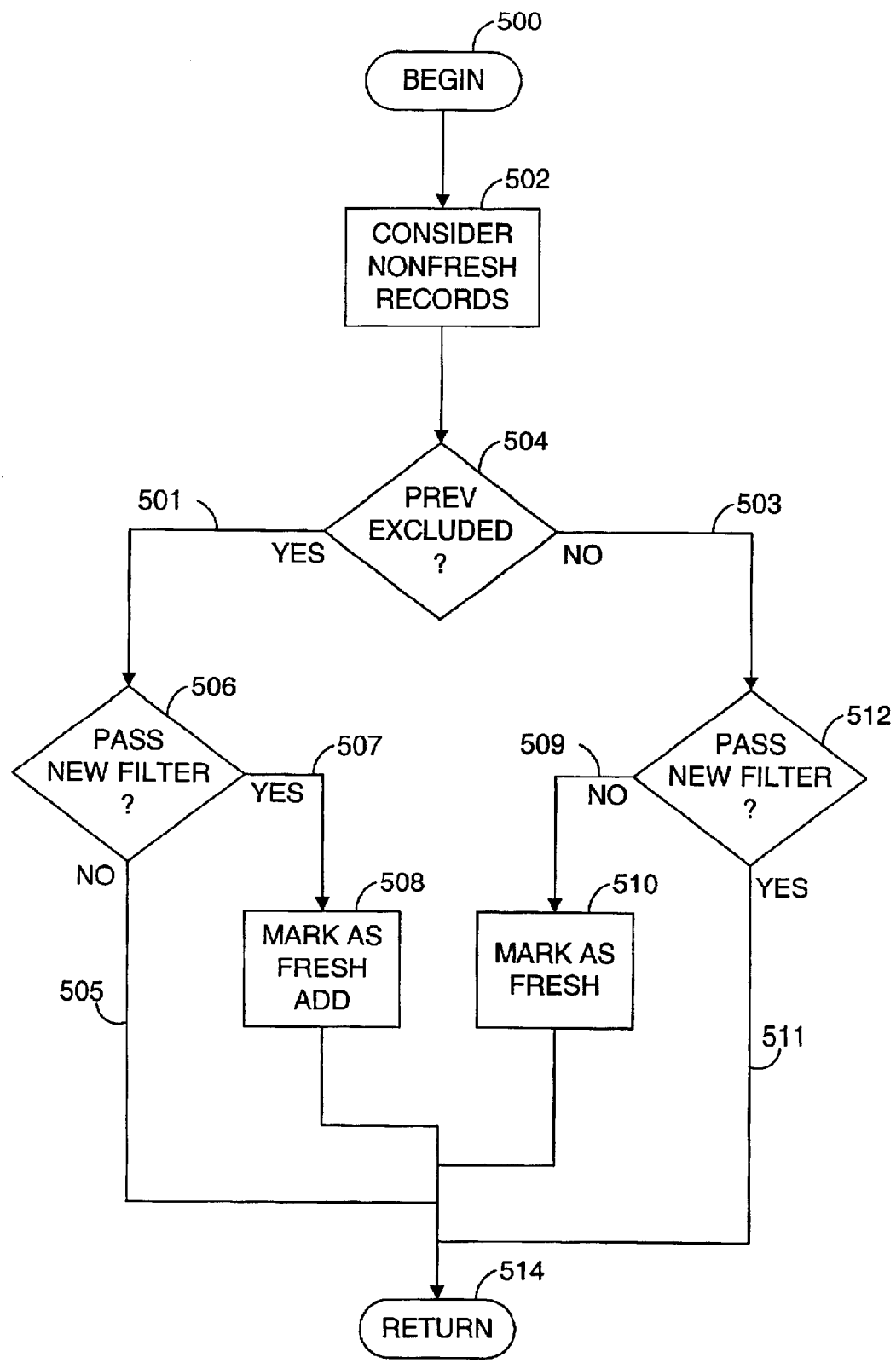
FIG. 5 is a flowchart of a first method of this invention that can be performed after a filter is activated or modified.

FIG. 5 is a flowchart illustrating a general method that may be implemented under this invention to process a new activation of the filter 123 or a change in the filter 123. The method of FIG. 5 might be executed under either of at least two scenarios. First, a user has been synchronizing the datasets 106 and 126 without the use of any filter 123, so that all of the user's records 440 in the sync database 126 are synchronized with the device database 106, i.e. without any records 440 being excluded from the database 106. Then, the user uses the sync interface 144 of the HTIP terminal 140 to set a new filter 123 through the sync engine 122. For example, the user may set the filter 123 to download to the device 100 only those calendar events that occur within the months of April or May. Once the user saves or activates this new filter 123, the sync engine 122 executes the method of FIG. 5. The method of FIG. 5 may be executed immediately after the new sync filter 123 is activated, without waiting for a subsequent synchronization request. The method of FIG. 5 does not actually synchronize the databases 126 and 106 according to the new filter 123, but simply prepares the database 126 so that, whenever the next synchronization does occur, the databases 106 and 126 will be synchronized according to the filter 123, that is with the exclusion of all records 440 that occur outside the months of April and May.

The second scenario under which the method of FIG. 5 may be executed occurs when the filter 123 is changed. Suppose that the filter 123 described above is currently active, and the databases 106 and 126 have been synchronized according to this filter 123, so that all records 440 that occur outside of the months of April and May are excluded from the database 106. The user may then use the sync interface 144 to change the filter 123. For example, the user may change the filter 123 to exclude all calendar entries that occur outside the months of May and June. The user may implement such a change by directly editing the existing filter 123 to change the beginning and ending dates that are to be included in the database 106, or he may deselect the existing filter 123 and activate a previously saved filter 123 that has the desired beginning and ending dates. After the user activates the new filter 123 that includes the months of May and June, the sync engine 122 executes the method of FIG. 5, again prior to the next synchronization between the databases 106 and 126. In the preferred embodiment, upon activation of a new filter 123 or upon change of an existing filter 123, this invention prepares the database 126 and the mapping table 128 so that the next synchronization will automatically be performed according to the new filter 123, without having to take any special actions during that next synchronization to account for the change in the filter 123. In this case, after the method of FIG. 5 is executed upon a change in the filter 123, the sync engine 122 can ignore the fact that the filter 123 has been changed and just execute a standard synchronization such as that depicted in FIG. 4A, whenever the next synchronization is initiated.

The method of FIG. 5 begins at an initial step 500 and proceeds to a process block 502. At the process block 502, the sync engine 122 considers all records 440 that are not fresh with respect to the device database 106. As described above, fresh records 440 (or fresh changes) are those that are to be synchronized with the device database 106, such as records 440 that have been added, updated or deleted since the last synchronization between the databases 106 and 126. As also described above, fresh changes can generally be determined by checking for records 440 for which there is no mapping record 470 or for which the modification time 436 is more recent than the corresponding sync time 468. Conversely, nonfresh records 440 are those records 440 for which there is currently no reason for synchronizing the record 440 with the database 106. Such nonfresh records 440 can generally be identified by requesting, from the database manager 124, all records 440 that have a mapping record 470, and for which the sync time 468 is more recent than the mod time 436.

There is no need to consider fresh changes here, as they are already set to be returned by the database manager 124 during the next normal synchronization process. As described in further detail below, the normal synchronization process of FIG. 4A automatically handles fresh changes at the process block 222 as required to implement the filter 123. Thus, as long as the records 440 are returned to the sync engine 122 for consideration during the method of the process block 222, the records 440 will be handled correctly. Because all of the fresh records 440 are already set to be returned to the sync engine 122 during the next synchronization, there is no need for any processing of those records 440 at this point, after a change in the filter 123.

After the process block 502, the process proceeds to a decision block 504. At the decision block 504, the sync engine 122 determines whether the record 440 under consideration was excluded from the device database 106 during the last synchronization. As described above, the sync engine 122 makes this determination by finding the appropriate mapping record 470 and checking the client record ID field 466. If the client record ID field 466 has a non-zero value, then the record 440 has not been excluded from the device 100. Otherwise, if the client record ID field 466 has a zero value, then the record 440 has been excluded from the device 100. If the record 440 has been previously excluded, then the process proceeds to a decision block 506, along a path 501. Otherwise, the process proceeds to a decision block 512, along a path 503.

At the decision block 506, the sync engine 122 determines whether the record 440 passes the new filter 123. If the record 440 passes the filter 123, then the process proceeds to a process block 508, along a path 507. Otherwise, the process proceeds to a terminal block 514, along a path 505. The path 507 is reached in the event that a record was previously excluded from the device 100, but now passes the filter 123. In this case, the record 440 should be added to the device database 106 at the next synchronization. Thus, at the process block 508, the sync engine 122 modifies the sync database 126 and/or the mapping table 128 to make it appear that the record 440 under consideration has recently been added to the sync database 126 (i.e. since the last synchronization), so that the record 440 will be returned as a fresh add during the next synchronization. In one embodiment, the mapping record 470 corresponding to the record 440, having the appropriate user ID 463 and device ID 464 is deleted. As described above, when the database manager 124 encounters a record 440 that has no mapping record 470 for a given user ID 463 and device ID 464, the database manager 124 considers the record 440 to be have been newly added since the last synchronization, and will return the record 440 to the sync engine 122 as a new add during the next synchronization. After the process block 508, the process proceeds to the terminal block 514. At the terminal block 514, after all of the nonfresh records 440 have been considered, the method of FIG. 5 terminates.

After termination of the method of FIG. 5, the database 126 and the mapping table 128 are configured so that, during the next synchronization, the sync engine 122 will automatically synchronize the databases 106 and 126 according to the filter 123, without taking any additional steps to account for the change in the filter 123. The path 505, which leads directly to the terminal block 514, is reached in the case of a record 440 that was previously excluded from the device database 106 and does not pass the new filter 123. In this case, there is no need to do anything to the record 440, as it was excluded during the previous synchronization and should be excluded during the next synchronization.

At the decision block 512, the sync engine 122 also determines whether the record 440 under consideration passes the new filter 123. If the record 440 passes the filter 123, the process proceeds to the terminal block 514, along a path 511. Otherwise, the process proceeds to a process block 510, along a path 509. The path 509 is reached if the record 440 was included during the previous synchronization, but it should be excluded, and therefore deleted, during the next synchronization because it no longer passes the filter 123. At the process block 510, the sync engine 122 marks the record 440 in a way that will cause the record 440 to be deleted during, the next synchronization. The way that the record 440 is marked to be deleted may vary, depending on the implementation. In one embodiment, the record 440 is marked so that it appears that the record 440 has been modified since the last synchronization between the databases 106 and 126, for example by setting the corresponding sync time 468 to zero or by updating the mod time 436 according to the current date/time of the system clock of the sync engine 122. After the process block 510, the process proceeds to the terminal block 514. The path 511, which leads directly to the terminal block 514 is reached in the event of a record 440 that was included in the device database 106 during the previous synchronization and passes the new filter 123 as well. In this case, nothing needs to be done in connection with the record 440. The record 440 has already been synchronized with the device database 106 and has not been modified since the last synchronization.

Figure 6:
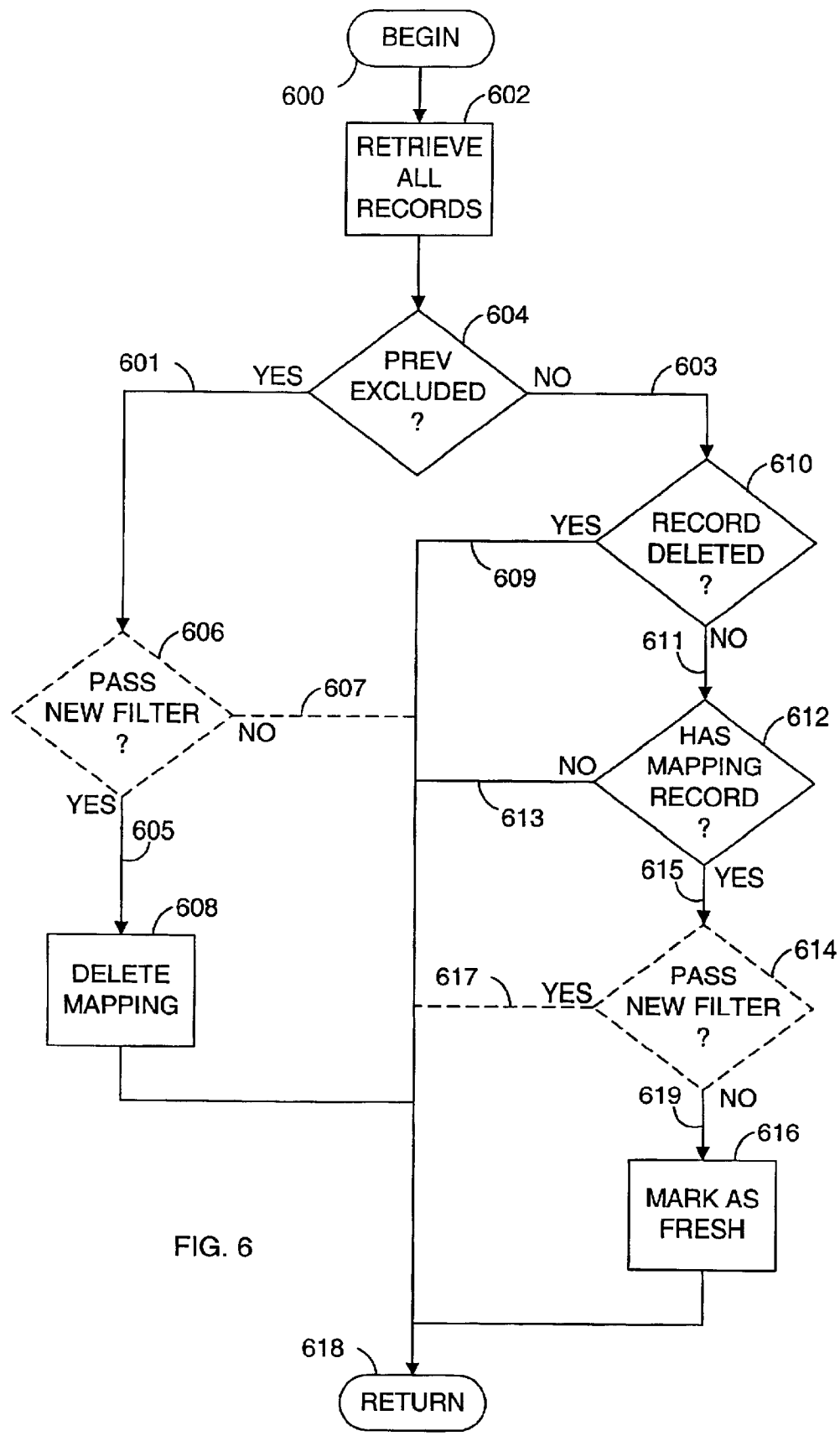
FIG. 6 is a flowchart of a second method of this invention that can be performed after a filter is activated or modified.
Figure 7F:
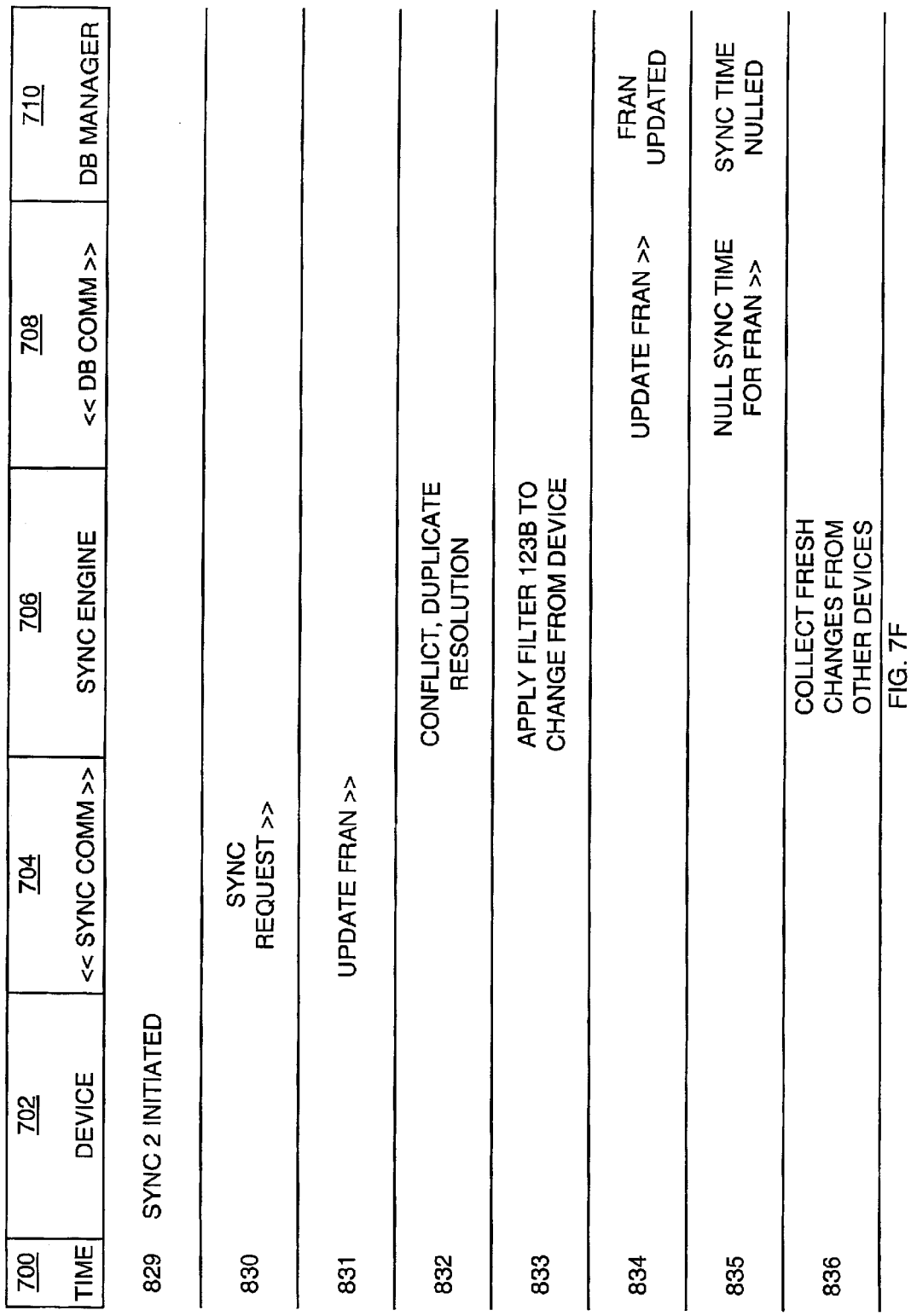
Figure 71:
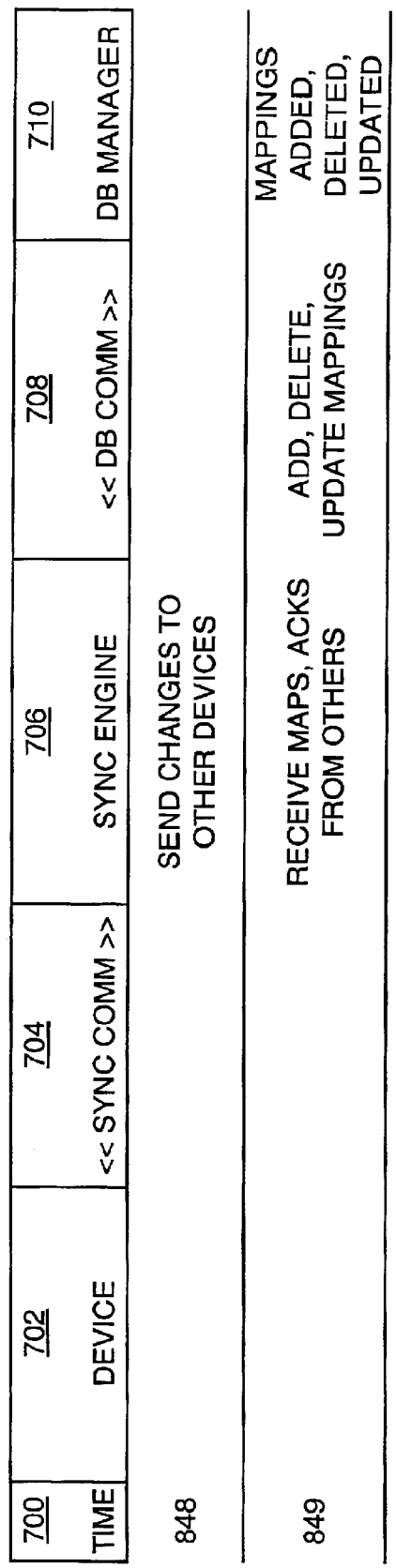

FIG. 6 is a flowchart illustrating another method that may be implemented under this invention to process a new activation of the filter 123 or a change in the filter 123. The method of FIG. 6 is an alternative to the method of FIG. 5, and would be executed under the same circumstances. The method of FIG. 6 has the same general objectives as the method of FIG. 5, such as configuring the sync database 126 and the mapping table 128 so that the new filter 123 will automatically be implemented by an ordinary synchronization process during the next synchronization, without having to take any unusual steps during that next synchronization to account for the changed filter 123. The method of FIG. 6 is more specific to a commercial synchronization system of the assignee, Starfish Software.

The method of FIG. 6 begins at an initial block 600. At a process block 602, the sync engine 122 retrieves all records 440 having the appropriate user ID 463 and device ID 464 from the sync database 126, through the database manager 124. The process then proceeds to a decision block 604. At the decision block 604, the sync engine 122 determines whether the record 440 under consideration was excluded from the device database 106 during the last synchronization. This step is the same as described above relative to the decision block 504 of FIG. 5. If the record 440 was excluded during the previous synchronization, then the process proceeds along a path 601. Otherwise, the process proceeds to a decision block 610, along a path 603.

An optional decision block 606 may be implemented in the path 601. In which case, the path 601 leads from the decision block 604 to the decision block 606. If the optional decision block 606 is not implemented, then the path 601 leads directly to a process block 608. At the optional decision block 606, the sync engine 122 applies the new filter 123 to the record 440, as described above in connection with the decision block 506. If the record 440 passes the filter 123, then the process proceeds to the process block 608, along a path 605. Otherwise, the process proceeds to a terminal block 618, along a path 607. At the process block 608, the sync engine 608 deletes the mapping record 470 corresponding to the record 440, and having the appropriate user ID 463 and device ID 464. As described above, a record 440 that has no corresponding mapping record 470 will be treated as a fresh add relative to the device database 106. Thus, during the next synchronization, the record 440 will be added to the device database 106. After the process block 608, the process proceeds to the terminal block 618. After processing all of the records 440 retrieved in the process block 602, the process of FIG. 6 ends at the terminal block 618. As described above relative to FIG. 5, after termination of the method of FIG. 6, the sync database 126 and the mapping table 128 will be configured so that the new filter 123 will be automatically implemented during the next ordinary synchronization between the databases 106 and 126.

The method of FIG. 6 will work correctly with or without the optional decision block 606. With the decision block 606, the records 440 that were previously excluded and that pass the new filter 123 will have their mapping records 470 deleted, while the records 440 that were previously excluded and that fail the filter 123 will not. Without the decision block 606, on the other hand, all records 440 that were previously excluded will have their mapping records 470 deleted. There is no need to delete the mapping record 470 of a record 440 that fails the filter 123. As described above, the purpose of deleting the mapping record 470 is to cause the record 440 to be treated as a fresh add during the next synchronization. But there is no need to treat a record 440 that fails the filter 123 as a fresh add, as it does not need to be added to the device database 106. At the same time, though, it will not cause any problems to delete the mapping record 470 for a record 440 that does not pass the filter. During the next synchronization, the database manager 124 will return such a record 440 to the sync engine 122, as a fresh add. However, during the process block 222 of FIG. 4A, the sync engine 122 will determine, at the decision block 252 of FIG. 4C, that the record 440 fails the filter 123 to and the sync engine 122 will cancel the add and recreate the mapping record 470. So, the decision block 606 may be implemented if it is advantageous to apply the filter 123 during the process of FIG. 6 and prescreen the records 440 that were previously excluded to see if they pass the filter 123, or the decision block 606 may be omitted if it is advantageous to avoid the prescreening and rely on the method of FIG. 4C to screen out the records 440 that still do not pass the filter 123. The decision whether or not to implement the decision block 606 will depend on the specific implementation and the overall requirements of the synchronization system.

Returning to the description of the process of FIG. 6, at the decision block 610, the sync engine 122 determines whether the record 440 under consideration has been deleted in the sync database 126. The record 440 may only be logically deleted, or it may be physically deleted. In one embodiment, the sync database 126 has a specific field for each record 440 to indicate whether the record 440 has been logically deleted. In this case, the sync engine 122 simply checks that field to see if the record 440 has been deleted. If the record 440 has been deleted, then the process proceeds to the terminal block 618, along a path 609. If the record 440 was previously included in the device database 106, but has since been deleted from the sync database 126, then there is no need to take any action at this point, as the record 440 is already set to be returned as a fresh delete, so the process can proceed directly to the terminal block 618. If the record 440 has not been deleted, then the process proceeds to a decision block 612, along a path 611.

At the decision block 612, the sync engine 122 determines whether the record 440 has a corresponding mapping record 470 with the appropriate user ID 463 and device ID 464. If there is a corresponding mapping record 470, then the process proceeds to a path 615. Otherwise, the process proceeds to the terminal block 618, along a path 613. If there is no mapping record 470, then the record 440 is already in a state which will cause it to be treated as a fresh add during the next synchronization. In this case, there is nothing else that needs to be done to the record 440 due to the new filter 123, and the process may proceed directly to the terminal block 618.

An optional decision block 614 may be implemented in the path 615. In which case, the path 615 leads from the decision block 612 to the decision block 614. If the optional decision block 614 is not implemented, then the path 615 leads directly to a process block 616. At the optional decision block 614, the sync engine 122 applies the new filter 123 to the record 440, as described above in connection with the decision block 506. If the record 440 does not pass the filter 123, then the process proceeds to the process block 616, along a path 619. Otherwise, the process proceeds to the terminal block 618, along a path 617. At the process block 616, the sync engine 122 marks the record 440 so that it appears to be a fresh update, as described above in connection with the process block 510 of FIG. 5, so that, during the next synchronization, the database manager 124 will return the record 440 to the sync engine 122 as a fresh update. If the record 440 was previously included in the device database 106, but the record 440 now fails the filter 123, then the fresh update will be changed to a delete at the process block 280 of FIG. 4C and the corresponding mapping record 470 will be updated at the process block 306, so that the record 440 will be deleted from the device database 106 during the next synchronization.

Again, the method of FIG. 6 will function properly with or without the conditional decision block 614. Similar to the decision block 606, the decision block 614 also implements a prescreening of the records 440 to see if they pass the filter 123. If a record 440 was previously included in the device database 106 and still passes the filter 123, then there is no need to mark the record 440 as a fresh update, because the device database 106 already has an up-to-date version of the record 440. However, again, marking such a record 440 as a fresh update will not cause any problems either. In this case, processing such a record 440 during the next synchronization would lead to the path 271. Such a record 440 would be returned to the sync engine 122 as a fresh update during the next synchronization, and no special processing would be done on the fresh update during the process block 222. So the fresh update would be sent to the device 100. The sync client 104 would likely go ahead and update its corresponding record 410 in the device database 106, but this would not cause any substantive change to the record 410, because it was already up-to-date from a previous synchronization. Again, there is a tradeoff in deciding whether to implement the optional decision block 614. In some situations, a system implementer may choose to add the decision block 614 to prescreen the records 440 to avoid sending unnecessary updates to the device 100, while in other situations, the system implementer may choose not to do the prescreening.

FIGS. 7A–7I form a table that shows a supposed sequence of events involving a system such as that shown in FIG. 2. This scenario is used to illustrate the operation of one embodiment of this invention. The table also shows actions that would be taken by the various elements of the system in response to the supposed events. A time column 700, the left-most column, shows reference times at which the different events and actions occur. A device column 702, the next column to the right, shows events that occur at the device 100 and actions taken by the device 100. A sync comm column 704, the next column to the right, shows communications that occur between the device 100 and the sync engine 122 ("synchronization communications"). A sync engine column 706, the next column to the right, shows events that occur at the sync engine 122 and actions taken by the sync engine 122. A DB comm column 708, the next column to the right, shows communications that occur between the sync engine 122 and the database manager 124 ("database communications"). A DB manager column 710, the right-most column, shows actions taken by the database manager 124.

FIGS. 8A–8C show the status of relevant portions of the device database 106, the sync database 126 and the mapping table 128, respectively, at a time 800 of the scenario of FIGS. 7A–7I. As shown in the time column 700 of FIG. 7A, the time 800 is the first reference time in the example scenario. FIGS. 9A–9C show the same information for a time 803. FIGS. 10A–10C show the same information for a time 815. FIGS. 11A–11C show the same information for a time 824. FIGS. 12A–12C show the same information for a time 827. FIGS. 13A–13C show the same information for a time 829. FIGS. 14A–14C show the same information for a time 841. FIGS. 15A–15C show the same information for a time 850. FIGS. 8A, 9A, 10A, 11A, 12A, 13A, 14A and 15A show values for record IDs 402, name fields 404A and city fields 404B of record data 404, and mod times 406 for a plurality of data records 410. FIGS. 8B, 9B, 10B, 11B, 12B, 13B, 14B and 15B show values for server record IDs 432, name fields 434A and city fields 434B of record data 434, and mod times 436 for a plurality of data records 440. FIGS. 8C, 9C, 10C, 11C, 12C, 13C, 14C and 15C show values for server record IDs 462, device Ids 464, client record IDs 466 and sync times 468 for a plurality of mapping records 470.

The scenario of FIG. 7A begins at the initial time 800. At this time, the filter 123 is already set at a first filter setting 123A such that records 440 are synchronized with (i.e. not excluded from) the device database 106 if the record 440 has a city field 434B containing either Dallas or San Diego. At this time, the device database 106, the sync database 126 and the mapping table 128 contain the data shown in FIGS. 8A–8C, respectively. The device database 106 has a first record 410 that has a record ID 402 of D0, a name field 404A of Dan, a city field 404B of Dallas and a mod time 406 of less than 800; a second record 410 that has a record ID 402 of D1, a name field 404A of Mark, a city field 404B of San Diego and a mod time 406 of less than 800; a third record 410 that has a record ID 402 of D2, a name field 404A of Bill, a city field 404B of Dallas and a mod time 406 of less than 800; a fourth record 410 that has a record ID 402 of D3, a name field 404A of Fran, a city field 404B of San Diego and a mod time 406 of less than 800; a fifth record 410 that has a record ID 402 of D4, a name field 404A of Joan, a city field 404B of Dallas and a mod time 406 of less than 800; a sixth record 410 that has a record ID 402 of D5, a name field 404A of Lisa, a city field 404B of San Diego and a mod time 406 of less than 800; a seventh record 410 that has a record ID 402 of D6, a name field 404A of Mike, a city field 404B of Dallas and a mod time 406 of less than 800; and an eighth record 410 that has a record ID 402 of D7, a name field 404A of Sally, a city field 404B of San Diego and a mod time 406 of less than 800. The records 410 may subsequently be referred to by either their record IDs 402 or their name fields 404A. Thus, the record 410 having the record ID 402 of D0 may be referred to as either "the record D0" or "the record 410 for Dan".

The sync database 126 has a first record 440 that has a record ID 432 of S0, a name field 434A of Tim, a city field 434B of Dayton and a mod time 436 of less than 800; a second record 440 that has a record ID 432 of S1, a name field 434A of Dan, a city field 434B of Dallas and a mod time 436 of less than 800; a third record 440 that has a record ID 432 of S2, a name field 434A of Mark, a city field 434B of San Diego and a mod time 436 of less than 800; a fourth record 440 that has a record ID 432 of S3, a name field 434A of Bill, a city field 434B of Dallas and a mod time 436 of less than 800; a fifth record 440 that has a record ID 432 of S4, a name field 434A of Fran, a city field 434B of San Diego and a mod time 436 of less than 800; a sixth record 440 that has a record ID 432 of S5, a name field 434A of Joan, a city field 434B of Dallas and a mod time 436 of less than 800; a seventh record 440 that has a record ID 432 of S6, a name field 434A of Lisa, a city field 434B of San Diego and a mod time 436 of less than 800; an eighth record 440 that has a record ID 432 of S7, a name field 434A of Fred, a city field 434B of Dayton and a mod time 436 of less than 800; a ninth record 440 that has a record ID 432 of S8, a name field 434A of Jane, a city field 434B of Dayton and a mod time 436 of less than 800; a tenth record 440 that has a record ID 432 of S9, a name field 434A of Ed, a city field 434B of Dayton and a mod time 436 of less than 800; an eleventh record 440 that has a record ID 432 of S10, a name field 434A of Mike, a city field 434B of Dallas and a mod time 436 of less than 800; and a twelfth record 440 that has a record ID 432 of S11, a name field 434A of Sally, a city field 434B of San Diego and a mod time 436 of less than 800. The records 440 may subsequently be referred to by either their record IDs 432 or their name fields 434A. Thus, the record 440 having the record ID 432 of S0 may be referred to as either "the record S0" or "the record 440 for Tim".

The mapping table 128 has a first record 470 that has a server record ID 462 of S0, a client record ID 466 of null and a sync time 468 of less than 800; a second record 470 that has a server record ID 462 of S1, a client record ID 466 of D0 and a sync time 468 of less than 800; a third record 470 that has a server record ID 462 of S2, a client record ID 466 of D1 and a sync time 468 of less than 800; a fourth record 470 that has a server record ID 462 of S3, a client record ID 466 of D2 and a sync time 468 of less than 800; a fifth record 470 that has a server record ID 462 of S4, a client record ID 466 of D3 and a sync time 468 of less than 800; a sixth record 470 that has a server record ID 462 of S5, a client record ID 466 of D4 and a sync time 468 of less than 800; a seventh record 470 that has a server record ID 462 of S6, a client record ID 466 of D5 and a sync time 468 of less than 800; an eighth record 470 that has a server record ID 462 of S7, a client record ID 466 of null and a sync time 468 of less than 800; a ninth record 470 that has a server record ID 462 of S8, a client record ID 466 of null and a sync time 468 of less than 800; a tenth record 470 that has a server record ID 462 of S9, a client record ID 466 of null and a sync time 468 of less than 800; an eleventh record 470 that has a server record ID 462 of S10, a client record ID 466 of D6 and a sync time 468 of less than 800; and a twelfth record 470 that has a server record ID 462 of S11, a client record ID 466 of D7 and a sync time 468 of less than 800. All of the values in the device ID field 464 for all of the records 470 in the tables 8C, 9C, 10C, 11C, 12C, 13C, 14C and 15C correspond to the device ID for the device 100. The records 470 may subsequently be referred to by reference to the contents of their server record ID field 462, such as "the record 470 for S0" for the first record 470, or by reference to the contents of the name field 434A of the corresponding record 440, such as "Tim's mapping record 470", also for the first record 470.

As can be seen in the mapping table 128, the records 470 for S0, S7, S8 and S9 contain null values for the client record ID field 466. As described above, this indicates that the corresponding records 440 have been excluded from the device database 106, based on an earlier application of the filter 123A. Each of the records S0, S7, S8 and S9 contains the value Dayton in the city field 434B. The value of Dayton does not satisfy the criteria of the filter 123A, which requires the city field 434B to have a value of Dallas or San Diego. Thus, it is appropriate that the records S0, S7, S8 and S9 be excluded from the device database 106. Also, as shown in FIG. 8A, the device database 106 does not contain records 410 corresponding to these records S0, S7, S8 and S9, as there are no records 410 having values in the name field 404A of Tim, Fred, Jane or Ed, which is appropriate for records that have been excluded from the device database 106. Also, as shown in the mapping table 128, the record S1 is mapped to the record D0, the record S2 is mapped to the record D1, the record S3 is mapped to the record D2, the record S4 is mapped to the record D3, the record S5 is mapped to the record D4, the record S6 is mapped to the record D5, the record S10 is mapped to the record D6 and the record S11 is mapped to the record D7. For example, the record 470 for S1 has a value of D0 in the client record ID field 466, indicating a mapping between the record S1 and the record D0. As shown in FIGS. 8A and 8B, these record mappings 470 for the records S1, S2, S3, S4, S5, S6, S10 and S11 are appropriate based on the contents of the device database 106 and the sync database 126. For example, the record S1 has a value of Dan in the name field 434A and the record D0 has the same value of Dan in the name field 404A, so that it is appropriate for these two records S1 and D0 to be mapped together. Thus, FIGS. 8A–8C show appropriate contents for the device database 106, the sync database 126 and the mapping table 128, respectively, for a situation in which the device database 106 and the sync database 126 have been synchronized according to the filter 123A, and no changes have been made to either the device database 106 or the sync database 126 since the synchronization.

At a time 801, as shown in FIG. 7A, a number of changes are made to the device database 106 at the device 100, as shown in the device column 702. These changes may be made by the user by using the PIM application 102. Specifically, the city field 404B of the record 410 for Bill is changed to Dayton, the city field 404B of the record 410 for Fran is changed to Dallas, the record 410 for Joan is deleted, and new records 410 have been added for Al, Tony and James. These changes to the device database 106 are reflected in FIG. 9A, as FIG. 9A shows the status of the device database 106 at the time 803. The changes to the city fields 404B for Bill and Fran can be seen in the respective records 410, and the mod times 406 for these records 410 have been changed to the time 801 at which the changes were made at the device 100. The record D4 for Joan has been deleted, as shown by the brackets around the D4 value in the record ID field 402. The deletion of the record D4 may be a logical deletion or a physical deletion. Again, the mod time 406 is updated to the new value of 801. A ninth record 410 has been added with a record ID 402 of D8, a name field 404A of Al, a city field 404B of San Diego and a mod time 406 of 801; a tenth record 410 has been added with a record ID 402 of D9, a name field 404A of Tony, a city field 404B of Dayton and a mod time 406 of 801; and an eleventh record 410 has been added with a record ID 402 of D10, a name field 404A of James, a city field 404B of Dayton and a mod time 406 of 801.

At a time 802, a number of changes are made to the sync database 126 at the server 120. These changes may be entered into the sync engine 122 by the user, using the PIM program 142. These changes are shown in the sync engine column 706. The sync engine 122 then communicates these changes to the database manager 124, as shown at the DB comm column 708. The database manager 124 then modifies the sync database 126 accordingly, as shown at the DB manager column 710. Specifically, the city field 434B of the record 440 for Jane is changed to Chicago, the city field 434B of the record 440 for Ed is changed to San Diego, the city field 434B of the record 440 for Mike is changed to San Diego, the city field 434B of the record 440 for Sally is changed to Dayton, the records 440 for Lisa and Fred are deleted, and new records 440 are added for Ted and Anne.

These changes to the sync database 126 are shown in FIG. 9B. The changes to the city fields 434B for Jane, Ed, Mike and Sally can be seen in the respective records 440, and the mod times 436 for these records 440 have been changed to the time 802 at which the changes were made at the server 120. The records S6 and S7, for Lisa and Fred respectively, have been deleted, as shown by the brackets around the respective values in the record ID fields 432. The deletion of the records in the sync database 126 are preferably logical deletions. Again, the mod time 436 is updated to the new value of 802 for each of these records 440. A thirteenth record 440 has been added with a record ID 432 of S12, a name field 434A of Ted, a city field 434B of Dallas and a mod time 436 of 802; and a fourteenth record 440 has been added with a record ID 432 of S 13, a name field 434A of Anne, a city field 434B of Dayton and a mod time 436 of 802.

FIGS. 9A–9C show the status of the device database 106, the sync database 126 and the mapping table 128 at the time 803. At this point, the method of FIG. 4A will be executed, beginning at the initial block 200. At the time 803, the user initiates a synchronization at the device 100. For example, the user may press a "sync" button on the device 100, or he may select a synchronization option from a menu on the device 100. The initiation of the synchronization at the device 100 is shown in the device column 702. This step corresponds to the step 202 of FIG. 4A. In response to the initiation of the synchronization at the device 100, at a time 804, the device 100 communicates a sync request to the sync engine 122, as shown in the sync comm column 704, and as shown at the step 204 of FIG. 4A.

At a time 805, the device 100 sends all fresh changes to the sync engine 122, as shown at the step 206 of FIG. 4A. In this case, the changes sent by the device 100 include the changes to the city field 404B for Bill and Fran, the deletion of the record for Joan and the additions of the records for Al, Tony and James, as shown in the sync comm column 704. These fresh changes can be identified by looking for records 410 for which the mod times 406 are more recent than the most recent synchronization time between the device database 106 and the sync database 126. In this scenario, we will assume that the last synchronization time is less than 800, but is more recent than the mod times 406 for the records 410 for Dan, Mark, Lisa, Mike and Sally. The sync engine 122 receives the changes from the device 100 and, as each change is received, performs conflict and duplicate resolution on the changes, as shown in the sync engine column 706 at a time 806, and as shown in the step 208 of FIG. 4A. Each of the changes sent from the device 100 to the sync engine 122 includes the record ID 402 of the affected record 410. The sync engine 122 uses the provided client record ID 402 and the mapping table 128 to identify the record 440 in the sync database 126 that corresponds to each change received from the device 100. For each update and delete received from the device 100, the mapping table 128 should contain a record 470 that maps the affected client record 410 to the corresponding sync database record 440. For each add, the sync engine 122 uses the provided client record ID 402 to create a new mapping record 470 linking the new client record 410 to the new sync database record 440 that is created in response to the add. For adds, the sync client 104 also provides to the sync engine 122 all other relevant data from the new record 410 that is to be added to the sync database 126, such as all of the contents of the new record 410. For updates, the sync client 104 may provide to the sync engine 122 the entire record 410 that is affected by the change, or the sync client 104 may only provide to the sync engine 122 the data fields from the affected records 410 that have actually been changed, depending on the design of the synchronization system and the capabilities of the devices 100, 160 and the sync server 120. For deletes, the sync client 104 need not provide any additional data to the sync engine 122.

Next, as shown in the step 210 of FIG. 4A, which is shown in greater detail in FIG. 4B, and at a time 807, the sync engine 122 applies the filter 123A to the changes received from the device 100. The changes may be processed in any order. When the sync engine 122 processes the change to the record 410 for Joan, at the decision block 236 of FIG. 4B, the sync engine 122 determines that the change is a delete and the process follows the path 241, and no special action is taken with respect to this change. When the sync engine 122 processes the adds of the records 410 for Al, Tony and James, the process of FIG. 4B follows the path 237 to the decision block 238. The record 410 for Al passes the filter 123A at the decision block 238, because the corresponding city field 404B contains San Diego, which is one of the two cities that passes the filter 123A. Thus, for the record 410 for Al, the method of FIG. 4B reaches the path 243, and no special action is taken. The records 410 for Tony and James, however, have city field 404B values of Dayton, which do not pass the filter 123A. Thus, the process of FIG. 4B takes the path 245 for these records 410 and reaches the step 242. Thus, the sync time 468 will be nulled for the records 470 that correspond to the records 410 for Tony and James. When processing the updates to the records 410 for Bill and Fran, the process of FIG. 4B follows the path 239 to the decision block 240. The new city field 404B for Bill is Dayton, which is not included in the filter 123A. Thus, due to the modification at the device 100, the record 410 for Bill no longer passes the filter 123A. Accordingly, the method of FIG. 4B reaches the path 247 for this record 410, and the sync time 468 will be nulled for the corresponding record 470, as required by the step 242. The record 410 for Fran, however, still passes the filter 123A, as its city field 404B is now Dallas. Thus, the method of FIG. 4B reaches the path 249, and no special action is taken with respect to this record 410.

Next, at the step 212 of FIG. 4A, the sync engine 122 propagates the changes from the device 100 into the sync database 126 and updates the mapping table 128. Propagating the changes into the sync database 126 occurs at a time 808, and updating the mapping table 128 occurs at a time 809. At the time 808, the sync engine 122 communicates the changes to the database manager 124, as shown in the DB comm column 708 and the changes are implemented in the sync database 126, as shown in the DB manager column 710. These changes can also be seen in the sync database 126 in FIG. 10B. Specifically, the record S5 for Joan is deleted, the city field 434B for Bill is changed to Dayton, the city field 434B for Fran is changed to Dallas, and new records S14, S15 and S16 are added for Al, Tony and James, respectively. The mod times 436 for each of these records 440 is updated to the time 808. At the time 809, the sync engine 122 communicates changes to the mapping table 128 through the database manager 124, as shown in the DB comm column 708, and the changes are implemented in the mapping table 128, as shown in the DB manager column 710. These changes can also be seen in the mapping table 128 in FIG. 10C. Specifically, new mapping records 470 are created for the new records S14, S15 and S16, indicating that the corresponding client IDs 466 are D8, D9 and D10, respectively, and the device ID 464 indicates the device 100. The sync time 468 is set to 809 for Al's mapping record 470, but the mapping records 470 for Tony and James are nulled, due to the analysis of FIG. 4B. This is done so that the records 440 for Tony and James will be considered fresh, so that they will be deleted from the device 100 because they do not pass the filter 123A. The sync time 468 for Bill is also nulled due to the same analysis and for the same reason. The mapping record 470 for Joan is deleted because the records 410 and 440 have been deleted from both the device 100 and the sync database 126, so there is no reason to retain the mapping record 470. The sync time 468 for Fran is updated to the value of 809, to indicate the time at which the record 410 of the device 100 was synchronized with the corresponding record 440 of the sync database 126.

At a time 810, the sync engine 122 receives fresh changes from the other client devices 160, as described above relative to the step 214 of FIG. 4A. At a time 811, the sync engine 122 performs conflict and duplicate resolution on the changes received from the other client devices 160, as described above relative to the step 216. At a time 812, the sync engine 122 applies respective filters 123 to the changes received from the other client devices 160, as appropriate, and as described above relative to the step 217. At a time 813, the sync engine 122 propagates the fresh changes received from the other client devices 160 that survive conflict and duplicate resolution and filtering into the sync database 126, as described above relative to the step 218. Similarly, at a time 814, the sync engine 122 updates the mapping table 128 according to the fresh changes received from the other client devices 160 that survive conflict and duplicate resolution and filtering, as also described above relative to the step 218. At the time 815, after the incoming phase of this first synchronization, the device database 106, the sync database 126 and the mapping table 128 are configured as shown in FIGS. 10A–10C.

At the time 815, the sync engine 122 requests of the database manager 124, all fresh changes from the sync database 126 that are to be synchronized with the devices 100, 160, as shown in the DB comm column 708. This may be done by issuing a separate database call for each of the devices 100, 160 with appropriate parameters, including appropriate user IDs, device IDs and synchronization times, as described above in connection with the step 220 of FIG. 4A. At a time 816, based on the parameters received from the sync engine 122, the database manager 124 analyzes the sync database 126 and the mapping table 128 to determine which records 440 should be considered fresh for each of the respective devices 100, 160, as shown in the DB manager column 710. This step corresponds to the step 220 of FIG. 4A.

The following discussion will focus on changes that are fresh relative to the device 100, but the discussion also applies to the determination of changes that are fresh relative to the other client devices 160. In this case, fresh adds are records 440 (a) for which there is no corresponding mapping record 470 in the mapping table 128 (i.e. no mapping record 470 having the appropriate user ID 463 and device ID 464, and having a server record ID 462 that matches the record ID 432 of the record 440) and (b) that have not been logically deleted. Fresh deletes are records 440 (a) for which the mod time 436 is more recent than the sync time 468 in a corresponding mapping record 470 (and for which there is a corresponding mapping record 470), and (b) that have been logically deleted. Fresh updates are records 440 (a) for which the mod time 436 is more recent than the sync time 468 in a corresponding mapping record 470 (and for which there is a corresponding mapping record 470), and (b) that have not been logically deleted. These fresh changes include changes that have been made directly to the sync database 126 using the HTTP terminal 140 and changes that have been received from the other client devices 160 during this synchronization session or during a previous synchronization session.

In this case, the records 440 for Ted and Anne are considered fresh adds, because there are no corresponding mapping records 470 and the records 440 have not been logically deleted. The record for Joan is not considered a fresh add because, although there is no corresponding mapping record 470, the record 440 has been logically deleted. The records 440 for Lisa and Fred are considered fresh deletes, because the mod times 436, each having a value of 802, are more recent than the sync times 468, each have a value of less than 800, and the records 440 have been logically deleted. Again, the record for Joan is not considered a fresh delete because there is no corresponding mapping record 470. The records 440 for Bill, Jane, Ed, Mike, Sally, Tony and James are considered fresh updates, because the mod times 436, having respective values of 808, 802, 802, 802, 802, 808 and 808, are more recent than the corresponding sync times 468, having respective values of 0, less than 800, less than 800, less than 800, less than 800, 0 and 0, and the records 440 have not been logically deleted. The database manager 124 returns these fresh changes to the sync engine 122 at a time 817, as shown in the DB comm column 708.

At a time 818, the sync engine 122 applies the filter 123A to the changes received from the database manager 124, as shown in the sync engine column 706, and as described above relative to the step 222 of FIG. 4A, which is described in greater detail in connection with FIG. 4C. As shown in FIG. 4C, each change is evaluated at the decision block 250. Processing the adds of Ted and Anne leads to the path 251 and the decision block 252. The record 440 for Ted passes the filter 123A, which leads to the path 257, while the record 440 for Anne does not pass the filter 123A, which leads to the path 255. Thus, no special actions are taken relative to the record 440 for Ted. However, as shown at the steps 254, 256 and 258, the add of Anne is canceled relative to the device 100, a mapping record 470 is created for the record 440 of Anne, but the client ID 466 is nulled to indicate that the record 440 has been excluded from the device 100, and the sync time 468 is updated with the time 818. This addition of the mapping record 470 for Anne is shown in FIG. 11C.

Processing the deletions of Lisa and Fred leads to the path 275 and the decision block 260. The deletion of Lisa leads to the path 259 because the record 440 was not previously excluded from the device 100, as can be seen by noticing that the client ID field 466 in the corresponding mapping record 470 is not nulled. Thus, there is no special processing relative to the record 440 for Lisa. The deletion of Fred leads to the path 261 because the record 440 was previously excluded from the device 100, as shown by the nulled client ID field 466. Thus, as shown at the process blocks 262 and 264, the deletion of Fred is canceled relative to the device 100 and the corresponding mapping record 470 is deleted. The deletion of the mapping record 470 for Fred is also shown in FIG. 11C.

Processing the updates to Bill, Jane, Ed, Mike, Sally, Tony and James leads to the path 253 and the decision block 268. The updates to Jane and Ed lead to the path 263 because the records 440 were previously excluded from the device 100, while the updates to Bill, Mike, Sally, Tony and James lead to the path 265 because the records 440 were not previously excluded from the device 100. The update to Jane next leads to the path 267 because the record 440 still does not pass the filter 123A. Thus, the update to Jane is canceled and the sync time 468 is updated, as shown in the process blocks 272 and 274. The updated sync time 468 is shown in FIG. 1 C. The update to Ed leads to the path 269 because the record 440 was previously excluded, but now passes the filter 123A. As shown in the process block 276, the update to Ed is changed to an add. No other special processing is done relative to the record 440 for Ed. The update to Mike further leads to the path 271 because the record 440 was not previously excluded from the device 100 and still passes the filter 123A. Thus, no special actions are taken on the record 440 for Mike. The updates to Bill, Sally, Tony and James, however, lead to the path 273 because these records 440 were not previously excluded, but they now fail the filter 123A. As shown in the step 280, the updates to Bill, Sally, Tony and James are changed to deletions. As described above, these deletions are specially marked to indicate that they resulted from failing an application of the filter 123A, so that, when the deletions are acknowledged by the device 100, the sync times 468 of the corresponding mapping records 470 can be nulled to indicate that the records 440 have been excluded from the device 100.

The modifications to the mapping table 128 are communicated from the sync engine 122 to the database manager 124 as shown in the DB comm column 708 and the modifications are implemented in the mapping table 128 as shown in the DB manager column 710. Both of these steps are shown as occurring at the time 818 in FIG. 7D.

At the process block 224, the sync engine 122 sends changes that survive filtering to the devices 100, 160. The changes to the device 100 are shown in the sync comm column 704 of FIG. 7D to be sent at a time 819. The device column 702 shows the device 100 propagating the changes into the device database 106 at the same time, which corresponds to the step 226 of FIG. 4A. Specifically, the device 100 deletes the records 410 for Bill, Lisa, Sally, Tony and James, changes the city field 404B for Mike to San Diego, and adds new records 410 for Ed and Ted, with the same data as the corresponding records 440 in the sync database 126. The device 100 also updates the mod times 406 for each of these records 410 to the time 819. All of these modifications to the device database 106 are shown in FIG. 11A.

The step 228 of FIG. 4A, in which the device 100, and the other devices 160, acknowledge receipt of the updates and deletes and send mapping messages for adds to the sync engine 122, is performed at a time 820, as shown in the sync comm column 704 at a time 820. In this case, the device 100 sends acknowledgements for the deletes of Bill, Lisa, Sally, Tony and James, and for the update to Mike. The acknowledgements for the deletes to Sally, Bill, Tony and James indicate that the deletes were specially marked as having resulted from the records 440 failing the filter 123A. The device 100 also sends mapping messages for the adds of Ed and Ted. The mapping messages indicate that the new records 410 for Ed and Ted have been assigned the record IDs of D11 and D12, respectively. The sync engine 122 receives these acknowledges and mapping messages, as shown in the sync engine column 706. The sync engine 122 then executes the method of the process block 230, which is shown in greater detail in FIG. 4D, for each of these received acknowledges and mapping messages. The method of FIG. 4D begins at the decision block 300 for each acknowledgement and mapping message. For the mapping messages for the adds of Ed and Ted, the method of FIG. 4D proceeds along the path 301, and the sync engine 122 communicates with the database manager 124 to create new corresponding mapping records 470, as shown at the process block 302. In the case of Ed, the previously existing mapping record 470, with the nulled client record ID 466, is deleted in the process block 314, but, in the case of Ted, there is no previously existing mapping record 470, so no action is taken at the process block 314. As shown in FIG. 11C, a mapping record 470 is added for Ed, mapping the server record ID S9 to the client record ID D11 for the device 100, and a mapping record 470 is added for Ted, mapping the server record ID S12 to the client record ID D12 for the device 100. The sync times 468 for Ed and Ted are updated to the value of 820 as indicated in the process block 304. For the deletions of Bill, Lisa, Sally, Tony and James, the method of FIG. 4D follows the path 305 to the decision block 308. For the deletion of Lisa, the sync engine 122 determines that the deletion was not caused by failing the filter 123A and proceeds along the path 309, so the corresponding mapping record 470 is deleted at the process block 310, as shown in FIG. 11C. For the deletions of Bill, Sally, Tony and James, the sync engine 122 determines at the decision block 308 that the deletions were caused by failing the filter 123A, so the sync engine 122 nulls the respective client record EDs 466, as shown in FIG. 11C. As described above, the acknowledgements from the device 100 indicate whether the corresponding deletions were specially marked to indicate that the deletions resulted from the records 440 failing the filter 123A. The method of FIG. 4D continues to the process block 304 for the records 440 for Bill, Sally, Tony and James, and the respective sync times 468 are updated to the value of 820. When processing the acknowledgement of the update to Mike, the method of FIG. 4D proceeds to the path 303, and the corresponding sync time 468 is updated to the value of 820 at the process block 304. All of these modifications to the mapping records 470 are shown in FIG. 11C. Also, the communication of these modifications to the mapping records 470 from the sync engine 122 to the database manager 124 are shown in the DB comm column 708 at the time 820, and the modifications are shown to be propagated to the sync database 126 in the DB manager column 710, also at the time 820.

If there are any filters 123 for any of the other client devices 160, these filters 123 will be applied to the changes that are to be sent to the respective other client devices 160 at a time 821, as shown in the sync engine column 706. At a time 822, the sync engine 122 sends any changes that survive application of the filters 123 to the appropriate other client devices 160, as again shown in the sync engine column 706. At a time 823, the sync engine 122 receives mapping messages and acknowledgements from the other client devices 160 and adds, deletes and/or updates the corresponding mapping records 470, as shown in the sync engine column 706, the DB comm column 708 and the DB manager column 710. These steps are the same as described above in connection with the device 100. After the time 823, the first synchronization is completed. FIGS. 11A–11C show the status of the device database 106, the sync database 126 and the mapping table 128, respectively, at the time 824.

At the time 824, the filter 123 for the device 100 is set to a new filter value 123B such that records 440 are excluded from the device 100, unless the city field 434B contains a value of Dallas or Dayton, as shown in the sync engine column 706. At a time 825, the sync engine 122 begins to process the change in the filter 123, as shown in the sync engine column 706. In this description, the sync engine 122 executes the method of FIG. 6, without the optional decision blocks 606 and 614. In alternative embodiments, as described above, the sync engine 122 could execute the method of FIG. 6 with either or both of the optional decision blocks 606 and 614, or the sync engine 122 could execute the method of FIG. 5. At the process block 602, the sync engine 122 makes a call to the database manager 124, requesting all records 440 in the sync database 126 pertaining to the device 100. In this example, the database manager 124 returns all records 440 shown in FIG. 11B. The decision block 604 is then executed for each record 440 returned by the database manager 124. For the records 440 for Tim, Bill, Jane, Sally, Anne, Tony and James, the method of FIG. 6 leads to the path 601 because the records 440 were previously excluded from the device 100, as can be seen from the existence of corresponding mapping records 470 having nulled client IDs 466. The mapping records 470 for these records 440 are deleted according to the process block 608. The sync engine 122 requests the database manager 124 to delete these mapping records 470, as shown in the DB comm column 708 at the time 825, and the database manager 124 makes the deletions in the mapping table 128, as shown in the DB manager column 710, also at the time 825.

The method of FIG. 6 leads to the path 603 for all other records 440 because the other records were not excluded from the device 100. At the decision block 610, the method of FIG. 6 leads to the path 609 for the records 440 for Joan, Lisa and Fred, because these records 440 have been logically deleted from the sync database 126. No further action is taken with respect to the records 440 for Joan, Lisa and Fred. The method of FIG. 6 leads to the path 611 for the remaining records 440 for Dan, Mark, Fran, Ed, Mike, Ted and Al, and then onto the path 615 because all of these remaining records 440 have corresponding mapping records 470. The sync times 468 of these remaining records 440 are set to a value of zero, as indicated in the process block 616 to mark these records 440 as fresh relative to the device 100. The sync engine 122 requests the database manager 124 to change the sync times 468 in the mapping table 128 for these records 440, as shown in the DB comm column 708 at the time 826, and the database manager 124 modifies the corresponding mapping records 470, as shown in the DB manager column 710, also at the time 826. The modifications to the mapping table 128 that are made during the times 825 and 826 are shown in FIG. 12C. At this point, the change to the filter 123 has been processed. The next time that a synchronization is initiated between the device database 106 and the sync database 126, the sync engine 122 can execute the standard synchronization process of FIG. 4A. The synchronization will occur according to the new filter 123B, without any further actions being taken specifically because of the change in the filter 123. All records 440 that may be affected by the change in the filter 123 will be returned as fresh changes by the database manager 124 to the sync engine 122, and the sync engine 122 will apply the new filter 123B in the course of a standard synchronization process, and take the appropriate actions with respect to all of the returned records 440.

At the time 827, as shown in FIG. 7E, a change is made to the device database 106 at the device 100, as shown in the device column 702. This change may be made by the user by using the PIM application 102. Specifically, the city field 404B of the record 410 for Fran is changed to San Diego. This change to the device database 106 is reflected in FIG. 13A, as FIG. 13A shows the status of the device database 106 at the time 829. The change to the city field 404B for Fran can be seen in the record 410 for Fran, and the mod time 406 for this record 410 has been changed to the time 827 at which the change was made at the device 100.

At a time 828, a number of changes are made to the sync database 126 at the server 120. These changes may be entered into the sync engine 122 by the user, using the PIM program 142. These changes are shown in the sync engine column 706. The sync engine 122 then communicates these changes to the database manager 124, as shown at the DB comm column 708. The database manager 124 then modifies the sync database 126 accordingly, as shown at the DB manager column 710. Specifically, the city field 434B of the record 440 for Bill is changed to Chicago, the city field 434B of the record 440 for Anne is changed to San Diego, the city field 434B of the record 440 for Al is changed to Dallas, the record 440 for Sally is deleted, and a new record 440 is added for John.

These changes to the sync database 126 are shown in FIG. 13B. The changes to the city fields 434B for Bill, Anne and Al can be seen in the respective records 440, and the mod times 436 for these records 440 have been changed to the time 828 at which the changes were made at the server 120. The record S11 for Sally has been deleted, as shown by the brackets around the value in the record ID field 432. The deletion of the records in the sync database 126 are preferably logical deletions. Again, the mod time 436 is updated to the new value of 828 for this record 440. An eighteenth record 440 has been added with a record ID 432 of S17, a name field 434A of John, a city field 434B of San Diego and a mod time 436 of 828.

FIGS. 13A–13C show the status of the device database 106, the sync database 126 and the mapping table 128 at the time 829. At this point, the method of FIG. 4A will be executed again, beginning at the initial block 200. At the time 829, the user initiates a synchronization at the device 100. For example, the user may press a "sync" button on the device 100, or he may select a synchronization option from a menu on the device 100. The initiation of the synchronization at the device 100 is shown in the device column 702. This step corresponds to the step 202 of FIG. 4A. In response to the initiation of the synchronization at the device 100, at a time 830, the device 100 communicates a sync request to the sync engine 122, as shown in the sync comm column 704, and as shown at the step 204 of FIG. 4A.

At a time 831, the device 100 sends all fresh changes to the sync engine 122, as shown at the step 206 of FIG. 4A. Again, the fresh changes can be determined by looking for records 410 having a mod time 406 that is more recent than the last synchronization time between the device database 106 and the sync database 126. More specifically, the last synchronization time may be set as the time at which changes were sent from the device 100 to the sync engine 122 during the previous synchronization. Thus, in this scenario, the last synchronization time was 805. In this case, the only fresh change in the device database 106 is the change to the city field 404B for Fran. This change is sent from the device 100 to the sync engine 122, as shown in the sync comm column 704. The sync engine 122 receives the change from the device 100 and performs conflict and duplicate resolution on the change, as shown in the sync engine column 706 at a time 832, and as shown in the step 208 of FIG. 4A. The change sent from the device 100 to the sync engine 122 includes the record ID 402 of the affected record 410, namely D3. The sync engine 122 uses the provided client record ID 402 and the mapping table 128 to identify the record 440 in the sync database 126 that corresponds to the change received from the device 100, namely the record S4, as shown in the mapping record 470 in the fifth row from the top of the mapping table 128 in FIG. 13C. For the update, the sync client 104 may provide to the sync engine 122 the entire record 410 that is affected by the change, or the sync client 104 may only provide to the sync engine 122 the data field from the affected record 410 that has actually been changed, depending on the design of the synchronization system and the capabilities of the devices 100, 160 and the sync server 120.

Next, as shown in the step 210 of FIG. 4A, which is shown in greater detail in FIG. 4B, and at a time 833, the sync engine 122 applies the filter 123B to the change received from the device 100. When the sync engine 122 processes the change to the record 410 for Fran, at the decision block 236 of FIG. 4B, the sync engine 122 determines that the change is an update and the process follows the path 239 to the decision block 240. The new city field 404B for Fran is San Diego, which is not included in the filter 123B. Thus, due to the modification at the device 100, the record 410 for Fran no longer passes the filter 123A. Accordingly, the method of FIG. 4B reaches the path 247 for this record 410, and the sync time 468 will be nulled for the corresponding record 470, as required by the step 242.

Next, at the step 212 of FIG. 4A, the sync engine 122 propagates the change from the device 100 into the sync database 126 and updates the mapping table 128. Propagating the change into the sync database 126 occurs at a time 834, and updating the mapping table 128 occurs at a time 835. At the time 834, the sync engine 122 communicates the change to the database manager 124, as shown in the DB comm column 708 and the change is implemented in the sync database 126, as shown in the DB manager column 710. This change can also be seen in the sync database 126 in FIG. 14B. Specifically, the city field 434B for Fran is changed to San Diego. The mod time 436 for this record 440 is updated to the time 834. At the time 835, the sync engine 122 communicates to the mapping table 128 through the database manager 124, as shown in the DB comm column 708, that the sync time 468 of the mapping record 470 for S4 is to be nulled, as determined in the analysis of FIG. 4B. This change is implemented in the mapping table 128, as shown in the DB manager column 710. However, this change has no effect on the mapping table 128, as the sync time 468 of the mapping record 470 for S4 had already been nulled. Thus, the record 440 for Fran will be considered fresh, so that the record 440 will be deleted from the device 100 because it does not pass the filter 123B.

At a time 836, the sync engine 122 receives fresh changes from the other client devices 160, as described above relative to the step 214 of FIG. 4A. At a time 837, the sync engine 122 performs conflict and duplicate resolution on the changes received from the other client devices 160, as described above relative to the step 216. At a time 838, the sync engine 122 applies respective filters 123 to the changes received from the other client devices 160, as appropriate, and as described above relative to the step 217. At a time 839, the sync engine 122 propagates the fresh changes received from the other client devices 160 that survive conflict and duplicate resolution and filtering into the sync database 126, as described above relative to the step 218. Similarly, at a time 840, the sync engine 122 updates the mapping table 128 according to the fresh changes received from the other client devices 160 that survive conflict and duplicate resolution and filtering, as also described above relative to the step 218. At the time 841, after the incoming phase of this second synchronization, the device database 106, the sync database 126 and the mapping table 128 are configured as shown in FIGS. 14A–14C.

At the time 841, the sync engine 122 requests of the database manager 124, all fresh changes from the sync database 126 that are to be synchronized with the devices 100, 160, as shown in the DB comm column 708. This may be done by issuing a separate database call for each of the devices 100, 160, with appropriate parameters, including appropriate user IDs, device IDs and synchronization times, as described above in connection with the step 220 of FIG. 4A. At a time 842, based on the parameters received from the sync engine 122, the database manager 124 analyzes the sync database 126 and the mapping table 128 to determine which records 440 should be considered fresh for each of the respective devices 100, 160, as shown in the DB manager column 710. This step corresponds to the step 220 of FIG. 4A.

The following discussion will focus on changes that are fresh relative to the device 100, but the discussion also applies to the determination of changes that are fresh relative to the other client devices 160. The determination of fresh changes is the same as described above with reference to the time 816.

In this case, the records 440 for Tim, Bill, Jane, Anne, Tony, James and John are considered fresh adds, because there are no corresponding mapping records 470 and the records 440 have not been logically deleted. There are no records 440 that are considered fresh deletes, because there are no records 440 that have been logically deleted and that have a corresponding mapping record 470. The records 440 for Dan, Mark, Fran, Ed, Mike, Ted and Al are considered fresh updates, because the mod times 436, having respective values of less than 800, less than 800, 834, 802, 802, 802 and 828, are more recent than the corresponding sync times 468, each having a value of 0, and the records 440 have not been logically deleted. The database manager 124 returns these fresh changes to the sync engine 122 at a time 843, as shown in the DB comm column 708.

At a time 844, the sync engine 122 applies the filter 123B to the changes received from the database manager 124, as shown in the sync engine column 706, and as described above relative to the step 222 of FIG. 4A, which is described in greater detail in connection with FIG. 4C. As shown in FIG. 4C, each change is evaluated at the decision block 250. Processing the adds of Tim, Bill, Jane, Anne, Tony, James and John leads to the path 251 and the decision block 252. The records 440 for Tim, Tony and James pass the filter 123B, which leads to the path 257, while the records 440 for Bill, Jane, Anne and John do not pass the filter 123B, which leads to the path 255. Thus, no special actions are taken relative to the records 440 for Tim, Tony and James. However, as shown at the steps 254, 256 and 258, the adds of Bill, Jane, Anne and John are canceled relative to the device 100, new mapping records 470 are created for each of these records 440, but the client IDs 466 are nulled to indicate that the records 440 have been excluded from the device 100, and the sync times 468 are updated with the time 844. These additions of mapping records 470 for Bill, Jane, Anne and John are shown in FIG. 15C.

Processing the updates to Dan, Mark, Fran, Ed, Mike, Ted and Al leads to the path 253 and the decision block 268. All of these updates also lead to the path 265 because the records 440 were not previously excluded from the device 100. The updates to Dan, Ted and Al further lead to the path 271 because the records 440 pass the filter 123B. Thus, no special actions are taken on the records 440 for Dan, Ted and Al. The updates to Mark, Fran, Ed and Mike, however, lead to the path 273 because these records 440 now fail the filter 123B. As shown in the step 280, the updates to Mark, Fran, Ed and Mike are changed to deletions. As described above, these deletions are specially marked to indicate that they resulted from failing an application of the filter 123B, so that, when the deletions are acknowledged by the device 100, the sync times 468 of the corresponding mapping records 470 can be nulled to indicate that the records 440 have been excluded from the device 100.

The modifications to the mapping table 128 referred to above are shown as occurring at the time 844 in FIG. 7H. The modifications are communicated from the sync engine 122 to the database manager 124 as shown in the DB comm column 708 and the modifications are implemented in the mapping table 128 as shown in the DB manager column 710.

At the process block 224, the sync engine 122 sends changes that survive filtering to the devices 100, 160. The changes to the device 100 are shown in the sync comm column 704 of FIG. 7H to be sent at a time 845. The device column 702 shows the device 100 propagating the changes into the device database 106 at the same time, which corresponds to the step 226 of FIG. 4A. Specifically, the device 100 deletes the records 410 for Mark, Fran, Ed and Mike, updates the records 410 for Dan, Ted and Al, and adds new records 410 for Tim, Tony and James, with the same data as the corresponding records 440 in the sync database 126. The city field 404B for Al is changed from San Diego to Dallas, to match the change in the corresponding record in the sync database 126. However, there have not been any modifications to the data in the records 440 for Dan and Ted, so the updates to the records 410 for Dan and Ted do not affect the data in these records 410. These records 410 already had the same data as the corresponding records 440. In one embodiment of this invention, the updates from the sync engine 122 to the device 100 include all of the data from the records 440, and this data is used to overwrite the data in the corresponding records 410. However, because the records 410 already had the same data as the records 440, overwriting the data in the records 410 has no real effect. The device 100 also updates the mod times 406 for each of these records 410 for Dan, Mark, Fran, Mike, Al, Ed, Ted, Tim, Tony and James to the time 845. All of these modifications to the device database 106 are shown in FIG. 15A.

The step 228 of FIG. 4A, in which the device 100, and the other devices 160, acknowledge receipt of the updates and deletes and send mapping messages for adds to the sync engine 122, is performed at a time 846, as shown in the sync comm column 704. In this case, the device 100 sends acknowledgements for the deletes of Mark, Fran, Ed and Mike, and for the updates to Dan, Ted and Al. The acknowledgements for all of the deletes indicate that the deletes were specially marked as having resulted from the records 440 failing the filter 123B. The device 100 also sends mapping messages for the adds of Tim, Tony and James. The mapping messages indicate that the new records 410 for Tim, Tony and James have been assigned the record IDs of D13, D14 and D15, respectively. The sync engine 122 receives these acknowledges and mapping messages, as shown in the sync engine column 706. The sync engine 122 then executes the method of the process block 230, which is shown in greater detail in FIG. 4D, for each of these received acknowledges and mapping messages. The method of FIG. 4D begins at the decision block 300 for each acknowledgement and mapping message. For the mapping messages for the adds of Tim, Tony and James, the method of FIG. 4D proceeds along the path 301, and the sync engine 122 communicates with the database manager 124 to create new corresponding mapping records 470, as shown at the process block 302. For each of these adds, there is no previously existing mapping record 470, so no action is taken at the process block 314. As shown in FIG. 15C, a mapping record 470 is added for Tim, mapping the server record ID S0 to the client record ID D13 for the device 100, a mapping record 470 is added for Tony, mapping the server record ID S15 to the client record ID D14 for the device 100, and a mapping record 470 is added for James, mapping the server record ID S16 to the client record ID D15 for the device 100. The sync times 468 for Tim, Tony and James are updated to the value of 846 as indicated in the process block 304. For the deletions of Mark, Fran, Ed and Mike, the method of FIG. 4D follows the path 305 to the decision block 308. For each of these deletions, the sync engine 122 determines at the decision block 308 that the deletions were caused by failing the filter 123B, so the sync engine 122 nulls the respective client record IDs 466, as shown in FIG. 15C. As described above, the acknowledgements from the device 100 indicate whether the corresponding deletions were specially marked to indicate that the deletions resulted from the records 440 failing the filter 123B. The method of FIG. 4D continues to the process block 304 for the records 440 for Mark, Fran, Ed and Mike, and the respective sync times 468 are updated to the value of 846. When processing the acknowledgement of the updates to Dan, Ted and Al, the method of FIG. 4D proceeds to the path 303, and the corresponding sync times 468 are updated to the value of 846 at the process block 304. All of these modifications to the mapping records 470 are shown in FIG. 15C. Also, the communication of these modifications to the mapping records 470 from the sync engine 122 to the database manager 124 are shown in the DB comm column 708 at the time 846, and the modifications are shown to be propagated to the sync database 126 in the DB manager column 710, also at the time 846.

If there are any filters 123 for any of the other client devices 160, these filters 123 will be applied to the changes that are to be sent to the respective other client devices 160 at a time 847, as shown in the sync engine column 706. At a time 848, the sync engine 122 sends any changes that survive application of the filters 123 to the appropriate other client devices 160, as again shown in the sync engine column 706. At a time 849, the sync engine 122 receives mapping messages and acknowledgements from the other client devices 160 and adds, deletes and/or updates the corresponding mapping records 470, as shown in the sync engine column 706, the DB comm column 708 and the DB manager column 710. These steps are the same as described above in connection with the device 100. After the time 849, the second synchronization is completed. FIGS. 15A–15C show the status of the device database 106, the sync database 126 and the mapping table 128, respectively, at the time 850.

While the invention is described in some detail with specific reference to a preferred embodiment and certain alternatives, there is no intent to limit the invention to that particular embodiment or those specific alternatives. Thus, the true scope of this invention is not limited to any one of the foregoing exemplary embodiments but is instead defined by the appended claims.

What is claimed is:

1. A method for synchronizing record data between a dataset and a data subset, wherein a filter specifies one or more criteria under which selected records in the dataset are excluded from synchronization with the data subset, the filter criteria being changeable from a previous set of criteria to a current set of criteria, and wherein a record in the dataset is fresh relative to the data subset when it is intended to be synchronized with the data subset, the method comprising:

performing one or more synchronizations between the dataset and the data subset, this performing step comprising the following substeps:
   (a) receiving a set of incoming changes from the data subset;
   (b) resolving conflicts between the incoming changes and the fresh dataset records;
   (c) filtering the incoming changes by marking any such incoming change that is an add or an update and that fails the current filter criteria as being fresh relative to the data subset;
   (d) for incoming changes that survive the step of resolving conflicts, propagating such incoming changes into the dataset;
   (e) for each fresh dataset record, generating an outgoing change for sending to the data subset;
   (f) filtering the outgoing changes by performing the following substeps:
      (i) if the outgoing change is an add and the dataset record fails the current filter criteria, canceling the add, marking the dataset record as excluded, and marking the record as no longer being fresh;
      (ii) if the outgoing change is a delete and the dataset record was excluded from the data subset during a most recent previous synchronization, canceling the delete;
      (iii) if the outgoing change is an update, the dataset record was excluded from the data subset during a most recent previous synchronization and the dataset record passes the current filter criteria, changing the update to an add;
      (iv) if the outgoing change is an update, the dataset record was excluded from the data subset during a most recent previous synchronization and the dataset record fails the current filter criteria, canceling the update and marking the dataset record as no longer being fresh; or
      (v) if the outgoing change is an update, the dataset record was included in the data subset during a most recent previous synchronization and the dataset record fails the current filter criteria, changing the update to a delete;
   (g) sending the outgoing changes that pass filtering to the data subset; and
   (h) for each outgoing change that is a delete that was caused by the dataset record failing the current filter criteria, marking the dataset record as being excluded from the data subset; and when the filter criteria are changed from a previous set of criteria to a current set of criteria, for each dataset record that is not fresh relative to the data subset:
   if the dataset record were excluded from the data subset during a most recent previous synchronization and the dataset record passes the current filter criteria, marking the dataset record as a fresh record that is to be added to the data subset during a subsequent synchronization; or
   if the dataset record were included in the data subset during a most recent previous synchronization and the dataset record fails the current filter criteria, marking the dataset record as a fresh record for a subsequent synchronization.

2. The method of claim 1, wherein the dataset is maintained in a synchronization server and the data subset is maintained in a client device.

3. The method of claim 2, wherein the synchronization server further comprises a sync engine, a database manager and a mapping table, and wherein the filter is maintained within the synchronization server.

4. The method of claim 3, wherein the client device further comprises a personal information manager and a sync client.

5. The method of claim 2, wherein the one or more synchronizations between the dataset and the data subset are initiated from the client device.

6. The method of claim 5, wherein after the substeps are performed in response to a change in the filter criteria, a subsequent synchronization is not performed until the client device initiates a subsequent synchronization.

7. The method of claim 1, wherein a record in the dataset is considered fresh if the record has been added, modified or deleted since a most recent previous synchronization between the dataset and the data subset.

8. The method of claim 7, wherein a record in the dataset is considered fresh if a time value indicating the last mod time is more recent than a time value indicating a last sync time.

9. The method of claim 8, wherein the last sync time indicates the time at which that particular record was last synchronized with the data subset.

10. The method of claim 8, wherein a record is marked as being fresh relative to the data subset by storing a new time value as the last mod time that is more recent than the last sync time.

11. The method of claim 9, wherein a record is marked as no longer being fresh relative to the data subset by storing a new time value as the last sync time for the record that is more recent than the last mod time for the record.

12. The method of claim 1, wherein a client record ID field is maintained for a dataset record to indicate a record ID of a record in the data subset that corresponds to the dataset record, and wherein the dataset record is marked as being excluded from the data subset by nulling this client record ID field.

13. The method of claim 12, wherein the client record ID field is maintained in a mapping table.

14. The method of claim 12, wherein a dataset record is determined to have been excluded from the data subset during a previous synchronization by determining that the record's client record ID field has been nulled.

15. A method for a sync engine to synchronize record data between a dataset, which is managed by a database manager, and a data subset, wherein a filter specifies one or more criteria under which selected records in the dataset are excluded from synchronization with the data subset, the method comprising:

receiving changes from the data subset and propagating the received changes into the dataset;

applying the filter criteria to the changes received from the data subset and, for changes that fail the filter criteria, marking the corresponding records in the dataset as being fresh relative to the data subset;

requesting from the database manager, changes that are fresh relative to the data subset;

applying the filter criteria to the changes received from the database manager and modifying the changes and the dataset records as required to implement the filter criteria; and sending changes that survive application of the filter criteria to the data subset.

16. The method of claim 15, wherein the step of modifying the changes and the dataset records as required to implement the filter criteria further comprises the substeps of:

for an add, if the change fails the filter criteria, canceling the add;

for a delete, if the corresponding dataset record was excluded from the data subset during a most recent prior synchronization, canceling the delete; and for an update:
  (a) if the corresponding dataset record was excluded from the data subset during a most recent prior synchronization and:
    (i) if the update passes the filter criteria, changing the update to an add; or
    (ii) if the update fails the filter criteria, canceling the update; or
  (b) if the corresponding dataset record was not excluded from the data subset during a most recent prior synchronization and the change fails the filter criteria, changing the update to a delete.

17. The method of claim 15, wherein if the filter criteria are changed, the method further comprises the following steps:

if a dataset record is not fresh relative to the data subset, the dataset record was excluded from the data subset during a most recent prior synchronization and the dataset record passes the changed filter criteria, marking the dataset record as a fresh add relative to the data subset; or if a dataset record is not fresh relative to the data subset, the dataset record was not excluded from the data subset during a most recent prior synchronization and the dataset record fails the changed filter criteria, marking the dataset record as being fresh relative to the data subset.

18. The method of claim 15, wherein a record in the dataset is considered fresh if the record has been added, modified or deleted since a most recent prior synchronization between the dataset and the data subset.

19. The method of claim 15, wherein if an incoming change is received from the data subset that fails the filter criteria, an outgoing change is sent back to the data subset to delete the record in the data subset that corresponds with the incoming change.

20. A method of synchronizing a dataset with a data subset, wherein a changeable filter identifies selected records from the dataset that are to be synchronized with the data subset, the method comprising:

occasionally synchronizing the selected records from the dataset with the data subset by performing the following substeps:
  (a) identifying one or more records in the dataset that have been modified since a most recent prior synchronization with the data subset as fresh changes;
  (b) applying the current filter to the fresh changes; and
  (c) sending the filtered, fresh changes that survive the application of the filter to the data subset; and when the filter is changed from a previous filter to a new filter, marking records that have not been modified since the most recent prior synchronization with the data subset, that were excluded from the data subset during the most recent prior synchronization and that pass the new filter as having been added to the dataset since the most recent prior synchronization, and marking records that have not been modified since the most recent prior synchronization with the data subset, that were not excluded from the data subset during the most recent prior synchronization and that fail the new filter as having been changed since the most recent prior synchronization.

21. The method of claim 20, wherein a subsequent synchronization is not performed after the filter is changed until a subsequent synchronization is initiated as an independent operation from the changing of the filter.

22. The method of claim 20, wherein the step of applying the current filter to the fresh changes comprises the following steps:

if a fresh change is an add which fails the current filter, canceling the add;

if a fresh change is a delete of a dataset record which was excluded from the data subset during the most recent prior synchronization, canceling the delete;

if a fresh change is an update to a dataset record which was excluded from the data subset during the most recent prior synchronization, wherein the fresh change fails the current filter, canceling the update;

if a fresh change is an update to a dataset record which was excluded from the data subset during the most recent prior synchronization, wherein the fresh change passes the current filter, changing the update to an add; or if a fresh change is an update to a dataset record which was not excluded from the data subset during the most recent prior synchronization, wherein the fresh change fails the current filter, changing the update to a delete.

23. The method of claim 20, wherein after the filter is changed, all records from the dataset are retrieved, those dataset records that were excluded from the data subset during the most recent prior synchronization are marked as having been added to the dataset since the most recent prior synchronization and those dataset records that were not excluded from the data subset during the most recent prior synchronization, that have not been deleted from the dataset, and that have not been added to the dataset since the most recent prior synchronization are marked as having been changed since the most recent prior synchronization.

24. The method of claim 23, wherein a dataset record is marked as having been added to the dataset since the most recent prior synchronization by deleting a mapping record corresponding to the dataset record.

25. A method for synchronizing record data from a dataset to a data subset, wherein a filter specifies one or more criteria under which selected records in the dataset are excluded from synchronization with the data subset, the dataset and the data subset having already been synchronized according to the filter criteria during a previous synchronization, the method comprising:
  (a) identifying one or more outgoing changes from one or more dataset records that have been added, modified or deleted since the previous synchronization;
  (b) applying the filter criteria to the outgoing changes and:
    (i) if the outgoing change is an add and the dataset record fails the filter criteria, canceling the add, marking the dataset record as excluded, and marking the record as no longer needing to be synchronized with the data subset;
    (ii) if the outgoing change is a delete and the dataset record was excluded from the data subset during the previous synchronization, canceling the delete;
    (iii) if the outgoing change is an update, the dataset record was excluded from the data subset during the previous synchronization and the dataset record passes the filter criteria, changing the update to an add;
    (iv) if the outgoing change is an update, the dataset record was excluded from the data subset during the previous synchronization and the dataset record fails the filter criteria, canceling the update and marking the dataset record as no longer needing to be synchronized with the data subset; or
    (v) if the outgoing change is an update, the dataset record was included in the data subset during the previous synchronization and the dataset record fails the filter criteria, changing the update to a delete;
  (c) sending the outgoing changes that pass filtering to the data subset; and
  (d) for each outgoing change that is a delete that was caused by the dataset record failing the filter criteria, marking the dataset record as being excluded from the data subset.

26. The method of claim 25 further comprising the following steps, which occur prior to the step of identifying one or more outgoing changes:
  receiving one or more changes from the data subset that are intended to be made to the dataset;
  performing conflict and duplicate resolution on the changes received from the data subset;
  propagating the received changes that survive conflict and duplicate resolution into the dataset; and
  applying the filter criteria to the received changes and, for the received changes that are adds or updates and that fail the filter criteria, marking the corresponding dataset records as having changed since the previous synchronization.

27. The method of claim 25, wherein the dataset is maintained within a synchronization server and the data subset is maintained within a client device.

28. The method of claim 27, wherein the outgoing changes that pass filtering are sent from the synchronization server to the client device and the client device sends acknowledgement messages for each of these changes back to the synchronization server.

29. The method of claim 28, wherein acknowledgement messages that are sent in response to adds include mapping information.

30. The method of claim 28, wherein the step of marking the dataset record as being excluded from the data subset for each outgoing change that is a delete that was caused by the dataset record failing the filter criteria is performed after the synchronization server receives an acknowledgement from the client device for the outgoing change.

31. The method of claim 30, wherein each outgoing change that is a delete that was caused by the dataset record failing the filter criteria is specially marked and an acknowledgement of such an outgoing change indicates that the outgoing change was specially marked in such a manner.

32. A method for accommodating a change in a data filter in a synchronization system, the synchronization system comprising a sync engine, a dataset and a data subset, the dataset comprising a first plurality of records and the data subset comprising a second plurality of records, the second plurality of records comprising a subset of the first plurality of records, the filter indicating which records in the first plurality of records are to be synchronized with the data subset, wherein one or more records in the first plurality that have not changed since a previous synchronization between the dataset and the data subset are currently in a state such that the records would not be considered for synchronization during a subsequent synchronization, the method comprising the steps of:
  receiving a change in the data filter, determining a first set of one or more records from the first plurality that failed the filter before the filter was changed and so were not synchronized during the previous synchronization and that pass the filter after the filter was changed, and marking the first set of records as newly added records so that the first set of records will be considered for synchronization with the data subset during the subsequent synchronization;
  determining a second set of one or more records from the first plurality that passed the filter before the filter was changed and were synchronized during the previous synchronization and that fail the filter after the filter was changed, and marking the second set of records as having changed since the previous synchronization so that the second set of records will be considered for synchronization with the data subset during the subsequent synchronization; and
  performing the subsequent synchronization between the dataset and the data subset according to the changed filter.

33. The method of claim 32, wherein the step of performing the subsequent synchronization is in response to an initiation of a synchronization that is independent of the change in the data filter.

34. The method of claim 32, wherein each of the first set of records is marked as a newly added record by deleting a corresponding mapping record in a mapping table.

35. The method of claim 32, wherein each of the second set of records is marked as having changed since the previous synchronization by setting a sync time for the record to be earlier than a mod time for the record.

36. A method of synchronizing a dataset with a first data subset and a second data subset, wherein a first filter indicates a first set of records from the dataset that are to be synchronized with the first data subset and a second filter indicates a second set of records from the dataset that are to be synchronized with the second data subset, the method comprising:
  receiving a first set of incoming changes from the first data subset, performing conflict resolution on the first set of incoming changes, applying the first filter to the first set of incoming changes and propagating one or more changes from the first set of incoming changes that survive conflict resolution and filtering into the dataset;

receiving a second set of incoming changes from the second data subset, performing conflict resolution on the second set of incoming changes, applying the second filter to the second set of incoming changes and propagating one or more changes from the second set of incoming changes that survive conflict resolution and filtering into the dataset;

determining a first set of outgoing changes to be sent to the first data subset, applying the first filter to the first set of outgoing changes and sending one or more changes from the first set of outgoing changes that survive filtering to the first data subset; and determining a second set of outgoing changes to be sent to the second data subset, applying the second filter to the second set of outgoing changes and sending one or more changes from the second set of outgoing changes that survive filtering to the second data subset.

37. The method of claim 36, wherein the dataset resides in a synchronization server, the first data subset resides in a first client device and the second data subset resides in a second client device, and wherein the first and second filters are maintained in the synchronization server.

38. The method of claim 36, wherein if one of the first set of incoming changes fails the first filter, an outgoing change will be generated to delete the corresponding record in the first dataset.

39. The method of claim 36, wherein if one of the second set of incoming changes fails the second filter, an outgoing change will be generated to delete the corresponding record in the second dataset.

* * * * *